US010345614B2

(12) United States Patent
Ichihashi

(10) Patent No.: US 10,345,614 B2
(45) Date of Patent: Jul. 9, 2019

(54) LENS DRIVING DEVICE

(71) Applicant: TDK Corporation, Minato-ku, Tokyo (JP)

(72) Inventor: Shusuke Ichihashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 522 days.

(21) Appl. No.: 15/136,510

(22) Filed: Apr. 22, 2016

(65) Prior Publication Data

US 2016/0313568 A1    Oct. 27, 2016

(30) Foreign Application Priority Data

| Apr. 23, 2015 | (JP) | 2015-088364 |
| Apr. 27, 2015 | (JP) | 2015-090331 |
| Jul. 21, 2015 | (JP) | 2015-144324 |
| Apr. 5, 2016 | (JP) | 2016-075787 |

(51) Int. Cl.
  *G02B 27/64* (2006.01)
  *G02B 7/08* (2006.01)
  (Continued)

(52) U.S. Cl.
  CPC ............ *G02B 27/646* (2013.01); *G02B 7/08* (2013.01); *G03B 17/02* (2013.01); *G03B 17/12* (2013.01)

(58) Field of Classification Search
  CPC .... G02B 27/646; G02B 15/173; G02B 15/14; G02B 15/177; G02B 7/08; G02B 15/16; G02B 15/22; G02B 13/18; G02B 7/09; G02B 13/009; G02B 27/64; G02B 7/04; G02B 13/02; G02B 13/0015; G02B 15/15; G02B 15/20; G02B 13/0045; G02B 15/167; G02B 15/17; G02B 27/0025; G02B 9/62; G02B 13/001; G02B 13/04; G02B 15/163;
  (Continued)

(56) References Cited

U.S. PATENT DOCUMENTS

| 9,151,963 B2 | 10/2015 | Sato et al. |
| 2011/0286732 A1 | 11/2011 | Hosokawa et al. |

(Continued)

FOREIGN PATENT DOCUMENTS

| CN | 102955324 A | 3/2013 |
| JP | 2009-9027 A | 1/2009 |

(Continued)

*Primary Examiner* — Collin X Beatty
*Assistant Examiner* — Grant A Gagnon
(74) *Attorney, Agent, or Firm* — Arent Fox LLP

(57) ABSTRACT

The present invention relates to the lens driving device comprising the spring. The spring comprises the holder installation parts installed to the lens holder, the frame installation parts installed to the frame, and the wire installation parts installed to the suspension wire. The space is formed between a first step plane of the frame, and a part of the spring positioned between the frame installation part and the wire installation parts; and the vibration absorbing member is placed at the space. At the damper space between the damper table and the rear plane of the frame, the vibration absorbing member is filled. At the inner circumference plane of the frame, the depression part is formed which is opened towards the space, and the vibration absorbing member which is filled in the space is also continuously filled to the depression part.

24 Claims, 27 Drawing Sheets

(51) Int. Cl.
*G03B 17/02* (2006.01)
*G03B 17/12* (2006.01)

(58) Field of Classification Search
CPC .......... G02B 7/023; G02B 7/102; G02B 9/64;
G02B 13/0065; G02B 15/10; G02B
23/02; G02B 7/02; G02B 7/022; G02B
7/14; G02B 9/04; G02B 9/34; G02B
9/60; G02B 13/002; G02B 13/004; G02B
13/06; G02B 13/16; G02B 15/12; G02B
15/161; G02B 17/08; G02B 17/0804;
G02B 17/0808; G02B 17/0896; G02B
21/26; G02B 26/004; G02B 26/0808;
G02B 26/0816; G02B 27/0911; G02B
27/644; G02B 3/14; G02B 7/021; G02B
7/025; G02B 7/18; G02B 7/24; G02B
7/28; G02B 9/00; G02B 9/24; G03B
5/00; G03B 2205/0015; G03B 3/10;
G03B 2205/0069; G03B 2205/0023;
G03B 2205/0007; G03B 13/36; G03B
17/02; G03B 17/04; G03B 17/14; G03B
17/12; G03B 2205/0046; G03B
2205/0053; G03B 2205/0092; G03B
2217/005; G03B 3/00; G03B 5/02; G03B
5/06; H04N 5/23287; H04N 5/2254;
H04N 5/23296; H04N 5/2257; H04N
5/2328; H04N 5/2253; H04N 5/23248;
H04N 5/23258; H04N 5/225; H04N
5/232; H04N 5/23209; H04N 5/23212;
H04N 5/23245; H04N 5/23264; H04N
13/204; H04N 13/239; H04N 13/296;
H04N 5/222; H04N 5/2252; H04N 5/228;
H04N 5/23229; H04N 5/23251; H04N
5/23254; H04N 5/23261; H04N 5/23274;
H04N 5/238
USPC .......................................................... 359/557
See application file for complete search history.

(56) References Cited

U.S. PATENT DOCUMENTS

| | | | |
|---|---|---|---|
| 2013/0235458 A1* | 9/2013 | Kawai | G02B 27/0006 359/507 |
| 2015/0022891 A1* | 1/2015 | Hu | G02B 7/08 359/557 |
| 2016/0241787 A1 | 8/2016 | Sekimoto | |

FOREIGN PATENT DOCUMENTS

| | | |
|---|---|---|
| JP | 2011-065140 A | 3/2011 |
| JP | 2011-112933 A | 6/2011 |
| JP | 2011-247909 A | 12/2011 |
| JP | 2013-044924 A | 3/2013 |
| JP | 2013-210550 A | 10/2013 |
| WO | WO 2015/045527 A1 | 4/2015 |

* cited by examiner

LENS DRIVING DEVICE

CROSS-REFERENCE TO RELATED APPLICATIONS

This application is U.S. patent application Ser. No. 15/136,510, filed Apr. 22, 2016, which claims priority to Japanese Patent Application No. 2015-088364, filed Apr. 23, 2015, Japanese Patent Application No. 2015-090331, filed Apr. 27, 2015, Japanese Patent Application No. 2015-144324, filed Jul. 21, 2015, and Japanese Patent Application No. 2016-075787, filed Apr. 5, 2016. The disclosures of the priority applications are incorporated in their entirety herein by reference.

BACKGROUND OF THE INVENTION

1. Field of the Invention

The present invention relates to a lens driving device suitably used for instance as a camera module of a mobile phone or so.

2. Description of the Related Art

As the lens driving device suitably used for instance as the camera module of the mobile phone or so, the device carrying out the blur correction by moving the blur correction movable part which include a lens holder holding the lens in the perpendicular direction against the optical axis.

For the conventional devices, a resonance of the blur correction movable part has been a problem. Thus, it is proposed to suppress unnecessary resonance by placing a damper material between the blur correction movable part and the coil substrate (Patent document 1).

For the conventional devices, the damper material is placed between the fixing part and the blur correction movable part which moves to the perpendicular direction against the optical axis, thereby suppressing the resonance of the perpendicular direction against the optical axis of the blur correction movable part.

However, for the conventional devices, if the damper material is filled too much between the blur correction movable part and the fixing part, then a responsiveness of the blur correction movement may be deteriorated. Also, even if the amount of the damper material is regulated to an appropriate amount, the point of the resonance may be generated by the frequency characteristic of AF driving. That is, it was difficult to effectively prevent the vibration of the movable part to the optical axis direction.

Note that, as shown in the patent document 2, the invention of placing the vibration absorbing member so that it contact with the suspension wire supporting the movable part is also known, however this aims to suppress the resonance of the perpendicular direction against the optical axis direction of the movable part, thus it was difficult to effectively prevent the vibration of the movable part to the optical direction.

[Patent document 1] JP Patent Application Laid Open No. 2013-44924

[Patent document 2] JP Patent Application Laid Open No. 2013-210550

SUMMARY OF THE INVENTION

The present invention was achieved in view of such situation, and the first object is to provide the lens driving device capable of effectively preventing the vibration of the movable part to the optical axis direction. The second object of the present invention is to provide the lens driving device capable of effectively suppressing the resonance of the lens holder against the frame, and also the lens driving device wherein the damper material suppressing the resonance rarely falls off. The third object of the present invention is to provide the lens driving device having large driving force for the blur correction, and capable of carrying out a good blur correction, and also the lens driving device wherein the damper material suppressing the resonance rarely falls off.

In order to accomplish the above mentioned object, the lens driving device according to the first aspect of the present invention is a lens driving device comprising a lens holder capable of holding at least one lens, a resilient member holding said lens so to allow a relative movement against a frame along an optical axis of said lens, an optical axis direction driving part allowing a relative movement of said lens holder against said frame along said optical axis, a supporting part connecting said resilient member and a fixing part so that said frame is supported in a movable manner against said fixing part along a direction crossing with said optical axis, and a crossing direction driving part moving said frame against said fixing part along the direction crossing with said optical axis; wherein said resilient member comprises a holder installation part installed to said lens holder, a frame installation part installed to said frame, a support installation part installed to said supporting part, a space is formed between said frame and a part of said resilient member which is positioned between said frame installation part and said support installation part, and a vibration absorbing member is placed in said space.

In the lens driving device according to the first aspect of the invention, a space is formed between the frame and a part of the resilient member positioned between the frame installation part and the support installation part; and the vibration absorbing member is placed in said space. Therefore, due to the combined effects of the resilient member and the vibration absorbing member, the vibration of the frame to the optical axis direction as the movable part can be effectively prevented. As a result, the risk of generating the resonance point by the frequency characteristic of the AF driving (for example at near 300 Hz) can be prevented in advance. Therefore, the shifting of the focus can be effectively prevented particularly when the person moves while recording a video. Furthermore, due to a resonance suppression effect, the resonance suppression effect in the blur correction direction is improved. In addition, the space between the frame and a part of the resilient member at the position where the vibration absorbing member is placed will function as the reservoir for supplying the vibration absorbing member, hence the vibration absorbing member does not fall off from the space.

Preferably, the vibration absorbing member is placed along an outer shape of said frame while being apart from said support installation part. By taking such constitution, it can further effectively prevent the vibration of the movable part in the optical axis direction.

For example, said frame has roughly a square ring shape, and said vibration absorbing members may be placed respectively at two or more positions near four corners of said frame along the outer shape of said frame while being apart from said support installation part. By taking such constitution, it can further effectively prevent the vibration of the frame as the movable part in the optical axis direction.

For example, the resilient members may be placed at four corner parts of the frame by being separated and insulated against each other. By constituting as such, for instance by using four supporting parts made of conductive member and four resilient members made of the conductive member, four conductive pathways towards the lens holder from the fixing part can be formed.

For example, a notch part may be formed at said frame so that the support installation part of said resilient member is placed at outer side of said frame. By constituting as such, while maintaining the size of frame compact, for instance the resilient member and the tip of the supporting part constituted by the suspension wire can be easily connected. Also, the movement to the direction crossing with the optical axis of the frame can be made smoother.

For example, a first step plane which is depressed in said optical axis direction to form said space is formed at said frame, and said vibration absorbing member is placed in the space between said first step plane and said resilient member. By taking such constitution, the filing of the vibration absorbing member becomes easy, and once the vibration absorbing member is filled, then it becomes difficult to fall off therefrom.

For example, a case fixed to said fixing part is arranged at the outer side of said frame, a second step plane depressed substantially in perpendicular direction with said optical axis is formed from the outer plane of said frame which has possibility to contact with an inner plane of said case due to the relative movement of said frame, and a contact surface of said frame where said vibration absorbing member contacts is arranged further inner side than said second step plane.

By taking such constitution, since the contact surface of the frame contacting with the vibration absorbing member is placed further inner side than the second step plane, thus even if the frame contacts with the inner circumference plane of the case by moving inside the case towards the direction crossing with the optical axis, the vibration absorbing member does not contact with the inner circumference plane of the case, hence the vibration absorbing member barely drips down or fall off from the predetermined position.

For example, said vibration absorbing member may also be in contact with a second plane of the resilient member which is positioned at the opposite of the first plane of said resilient member contacting with said vibration absorbing member placed in said space. By taking such constitution, the resilient member contacts with the vibration absorbing member from the both planes of the first plane and the second plane, thus the vibration suppressing effect can be further enhanced.

For example, at a part of said resilient member to which said vibration absorbing member contacts at both of the first plane and the second plane, a through hole penetrating through said first plane and said second plane is formed. By taking such constitution, the vibration absorbing member can be easily filled through the through hole, and also the vibration absorbing member can be easily placed at both planes of the resilient member.

For example, said support installation part formed at said resilient member has a depressed shape towards the inside as in a shape of letter U. By taking such constitution, for example the tip of the supporting part constituted by suspension wire or so can be easily installed to the support installation part of the resilient member via the depression having a shape of letter U.

For example, said support installation part is formed at a crossing part of a pair of arm parts continuous with said frame installation part, said arm part has a part which does not contact with said vibration absorbing member, and other than the crossing part of these arm parts, a bridge part to bridge these arm parts may be formed at said resilient member.

By taking such constitution, the stress trying to concentrate on the arm part can be dispersed to the bridge part, and the strength of the support installation part can be improved, thus the tip of the supporting part constituted by the suspension wire or so can be effectively prevented from coming off from the resilient member.

For example, said resilient member may have a part where width of said resilient member becomes narrower at some point of said resilient member towards said support installation part from said frame installation part. By taking such constitution, the resilient force improves, thus the buckling of the supporting part constituted by the suspension wire or so can be effectively prevented.

For example, a tongue part is formed at said support installation part, and said vibration absorbing member may be placed between said frame and at least a part of said tongue part. By taking such constitution, the resonance suppression effect improves, and particularly the resonance suppression effect of the blur correction direction is improved. Also, preferably, said tongue part is constituted so that it projects out towards said optical axis from said support installation part. By taking such constitution, a part of the tongue part will contact with the frame via the vibration absorbing member without interfering a part of the resilient member.

In order to achieve the above mentioned second object, the lens driving device according to the second aspect of the present invention comprises a lens holder capable of holding at least one lens, a driving part moving said lens holder relative to a frame along an optical axis of said lens, wherein in a space between outer circumference plane of said lens holder and inner circumference plane of said frame, a vibration absorbing member is filled in at least one point along the circumference direction, at either one of the outer circumference plane of said lens holder and inner circumference plane of said frame, a depression part is formed which is opened towards said space at the position where said vibration absorbing member is filled in, and said vibration absorbing member filled in said space is also continuously filled in said depression part.

In the lens driving device according to the second aspect of the present invention, at the space between the outer circumference plane of the lens holder and the inner circumference plane of said frame, the vibration absorbing member is filled in at least one place along the circumference direction. Therefore, the resonance of the lens holder against the frame can be effectively suppressed. As a result, there is no risk of resonance of the lens holder against the frame during the blur correction operation or the auto focus operation, and particularly during the auto focus operation; thus such operation can be carried out in good condition.

Further, in the lens driving device according to the second aspect of the present invention, in at least one of the outer circumference plane of said lens holder and the inner circumference of said frame at the position where the vibration absorbing member is filled, the depression part is formed which is opened towards said space. Therefore, the depression part function as the reservoir part for the vibration absorbing part, hence even if the lens holder moves to the optical axis direction or to the perpendicular direction against the optical axis with respect to the frame, the vibration absorbing member does not fall off from the space. Particularly, in case the impact is applied as being dropped or so, and even if the lens holder moves to the optical axis direction or to the perpendicular direction against the optical axis with respect to the frame, the vibration absorbing member does not fall off from the space.

Preferably, said vibration absorbing member is filled in three or more places at between the outer circumference plane of said lens holder and the inner circumference plane of said frame along the circumference direction. By providing the vibration absorbing members at plurality of positions, the resonance of the lens holder in the tilt direction against the frame can be effectively prevented. Also, the resonance suppression effect to the optical axis direction and the perpendicular direction against the optical axis can be enhanced.

Preferably, said frame is roughly a square ring shape, said vibration absorbing member is filled in the space between the outer circumference plane of said lens holder and the inner circumference plane of said frame near the four corners of said frame respectively, and said depression parts are respectively formed near each four corner parts.

Due to such constitution, by utilizing the vacant space at the inner circumference plane of the frame, the vibration absorbing member can be placed, and also the vibration absorbing member is placed on the diagonal line, thereby the resonance of the lens holder in the direction of the tilt movement against the frame can be prevented further effectively.

Preferably, said depression part is formed at the inner circumference plane of said frame. There is still room left at the inner circumference plane of the frame, particularly at the inner circumference plane of the corner part, thus by proving the inner side projection part, the depression part can be easily formed to the front plane of the inner side projection part. The gel substance which becomes the vibration absorbing material can be easily introduced to this depression part, thus the work efficiency improves. Note that, the depression part may be formed at the outer circumference plane of the lens holder, or it may be formed at both of the inner circumference plane of the frame and the outer circumference plane of the lens holder.

In order to achieve the above mentioned third object, the lens driving device according to the third aspect of the present invention comprises a movable part capable of holding at least one lens, a first driving part allowing said movable part to move relative to a fixing part along a first driving axis crossing with an optical axis of said lens, and a second driving part allowing said movable part to move relative to said fixing part along a second driving axis crossing with the optical axis of said lens and with said first driving axis; wherein at a front plane of said fixing part, a first driving coil constituting a part of said driving part, and a second driving coil constituting a part of said second driving part are fixed, at a rear plane of said movable part, a first driving magnet and a second driving magnet are fixed so as to face with said first driving coil and second driving coil across a driving space, a pedestal is provided at the front plane of said fixing part, a vibration absorbing member is filled in the damper space between the front plane of said pedestal and the rear plane of said movable part, and said damper space is larger than said driving space.

In the lens driving device according to the third aspect of the present invention, the coil is not embedded in the coil substrate, but the first driving coil and the second driving coil are fixed at the front plane of the circuit substrate as the fixing part. Therefore, the number of winding of the driving coil can be easily increased, and the driving force of the driving coil can be increased.

Further, in the lens driving device according to the third aspect of the present invention, a pedestal is provided at the front plane of the circuit substrate as the fixing part, and the vibration absorbing member is filled in the damper space between this pedestal and the rear plane of the movable part. Therefore, the vibration absorbing member becomes difficult to fall off compared to the case wherein the vibration absorbing member is directly filled to the front plane of the circuit substrate as the fixing part. As a result, the damper characteristic by the vibration absorbing member is improved, the resonance can be prevented, and the blur correction ability is improved. That is, the resonance of the movable part against the fixing part to the perpendicular direction against the optical axis can be suppressed, and also the resonance in the optical direction can be effectively suppressed.

Also, since the pedestal is provided at the front plane of the circuit substrate as the fixing part, by adjusting the area of the front plane of the pedestal, the coating amount of the gel substance which is the vibration absorbing member can be easily controlled; hence the necessary amount of the vibration absorbing member can be easily formed. Further, when the impact during the falling or so acts thereon, since the damper space is larger than the driving space, as the driving coil and the driving magnet collides against each other, the stopper function comes into effect, thus the damper space will not be lost. Therefore, the vibration absorbing member will not completely slip out of the damper space.

Preferably, a height of said first driving coil and said second driving coil from the front plane of said fixing part are higher than a height of said pedestal. As the pedestal is lower than the driving coil, the damper space can be sufficiently larger than the driving space.

Preferably, said movable part comprises a frame holding said first driving magnet and the second driving magnet, and said vibration absorbing member is filled in said damper space formed between the rear plane of said frame and front plane of said pedestal.

The frame can be constituted by plastic or so, and the contact area with the vibration absorbing member can be easily adjusted, thus the filling amount of the vibration absorbing amount can be easily controlled.

Preferably, said fixing part is roughly a square board shape, said first driving coil and the second driving coil are respectively fixed at four sides positions of said fixing part having square board shape, and said pedestal is fixed to each four corner positions of said fixing part having square board shape.

Due to such constitution, by utilizing the vacant space at the front plane of the fixing part, the vibration absorbing member can be placed, and also the vibration absorbing member is placed on the diagonal line, thereby the resonance of the movable part in the direction of tilt movement against the fixed member can be prevented further effectively.

Preferably, said fixing part comprises a circuit substrate, and said first driving coil and said second driving coil are fixed at the front plane of said circuit substrate, and said pedestal is a chip component fixed to the front plane of said circuit substrate.

The chip component can be constituted for example by the ceramic electronic components or so. In case of the chip component, the terminal (external) electrode is formed; hence the connection or the adhesion to the fixing part such as the circuit substrate or so can be done easily. Also, the component has a rough surface, thus has excellent bonding with the vibration absorbing member, and the falling of the vibration absorbing member from the pedestal can be effectively suppressed. Note that, the vibration absorption member may adhere not only to the front plane of the pedestal but also to the side plane.

At the rear plane of said movable part, the rear plane projection part is formed which projects out towards said pedestal, and said damper space may be formed between said rear plane projection part and said pedestal.

By constituting as such, the width of the damper space along the optical axis direction can be controlled easily. Note that, in the present invention, the rear plane projection part which projects out towards the pedestal may not be present.

DESCRIPTION OF THE PREFERRED EMBODIMENTS

Hereinafter, the present invention will be described based on the embodiments shown in the figures.

First Embodiment

Figure 1A:
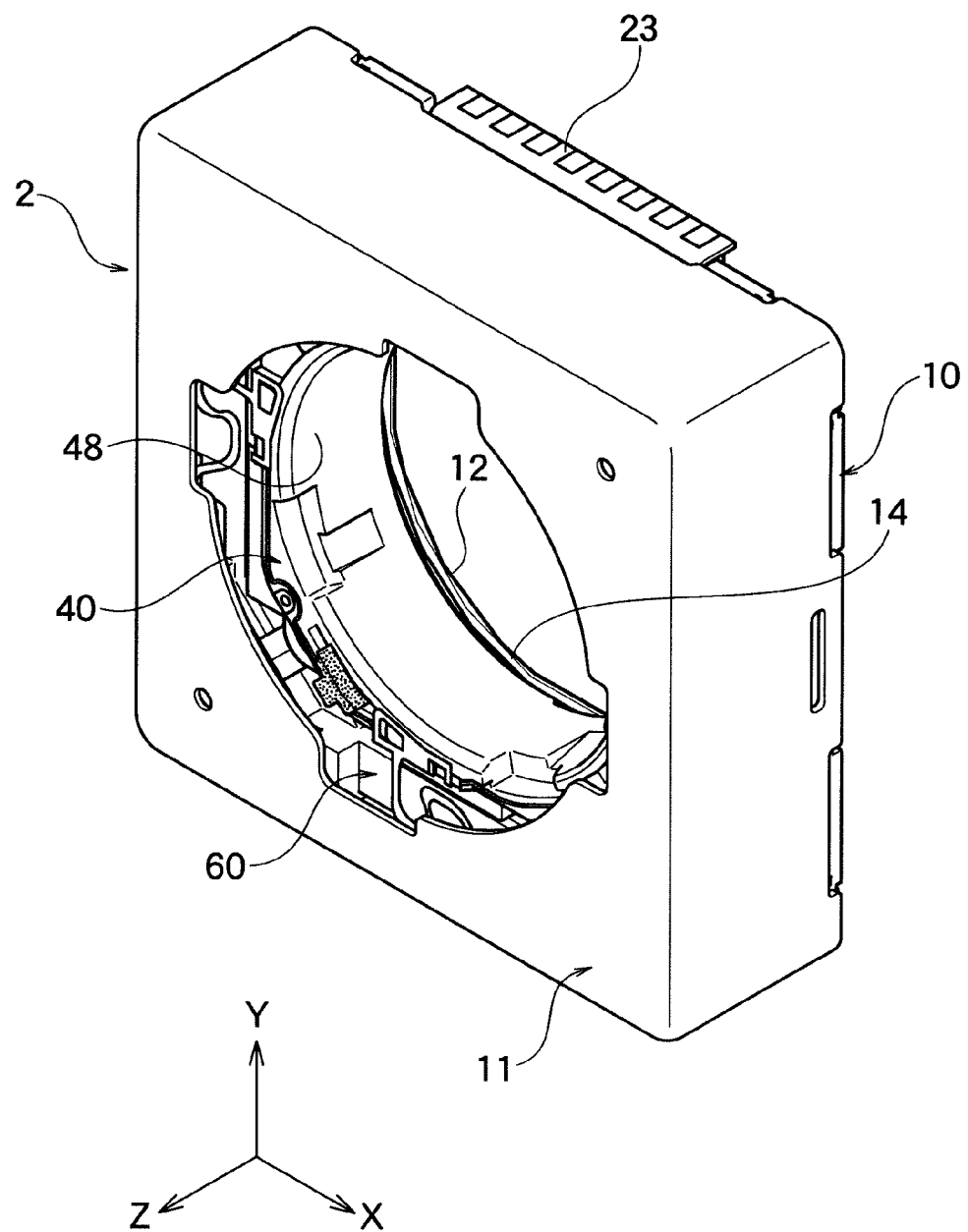
FIG. 1A is the perspective view of the entire lens driving device according to one embodiment of the present invention.
Figure 1B:
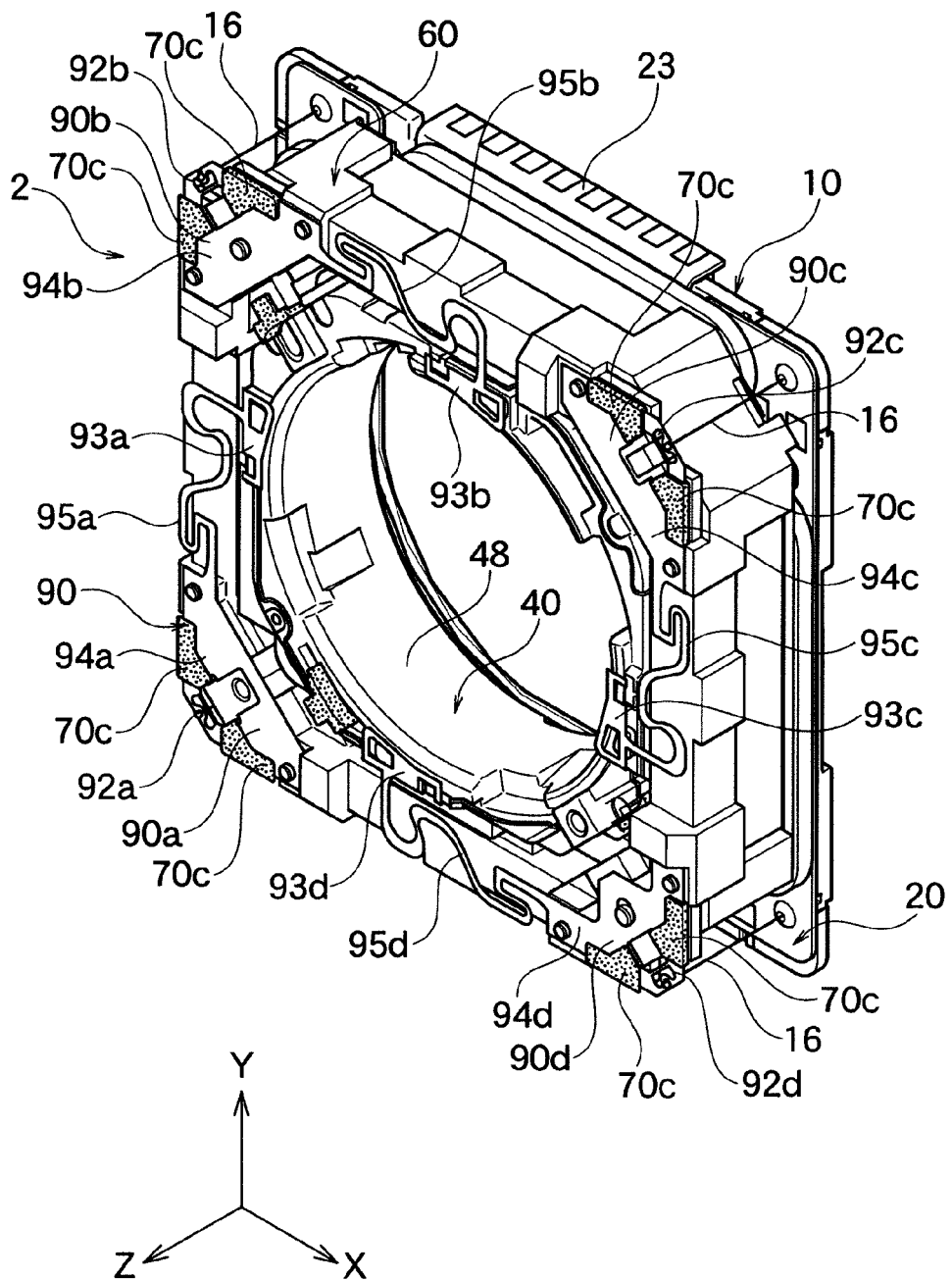
FIG. 1B is the perspective view showing the interior of entire lens driving device wherein the case shown in FIG. 1A is removed.
Figure 2:
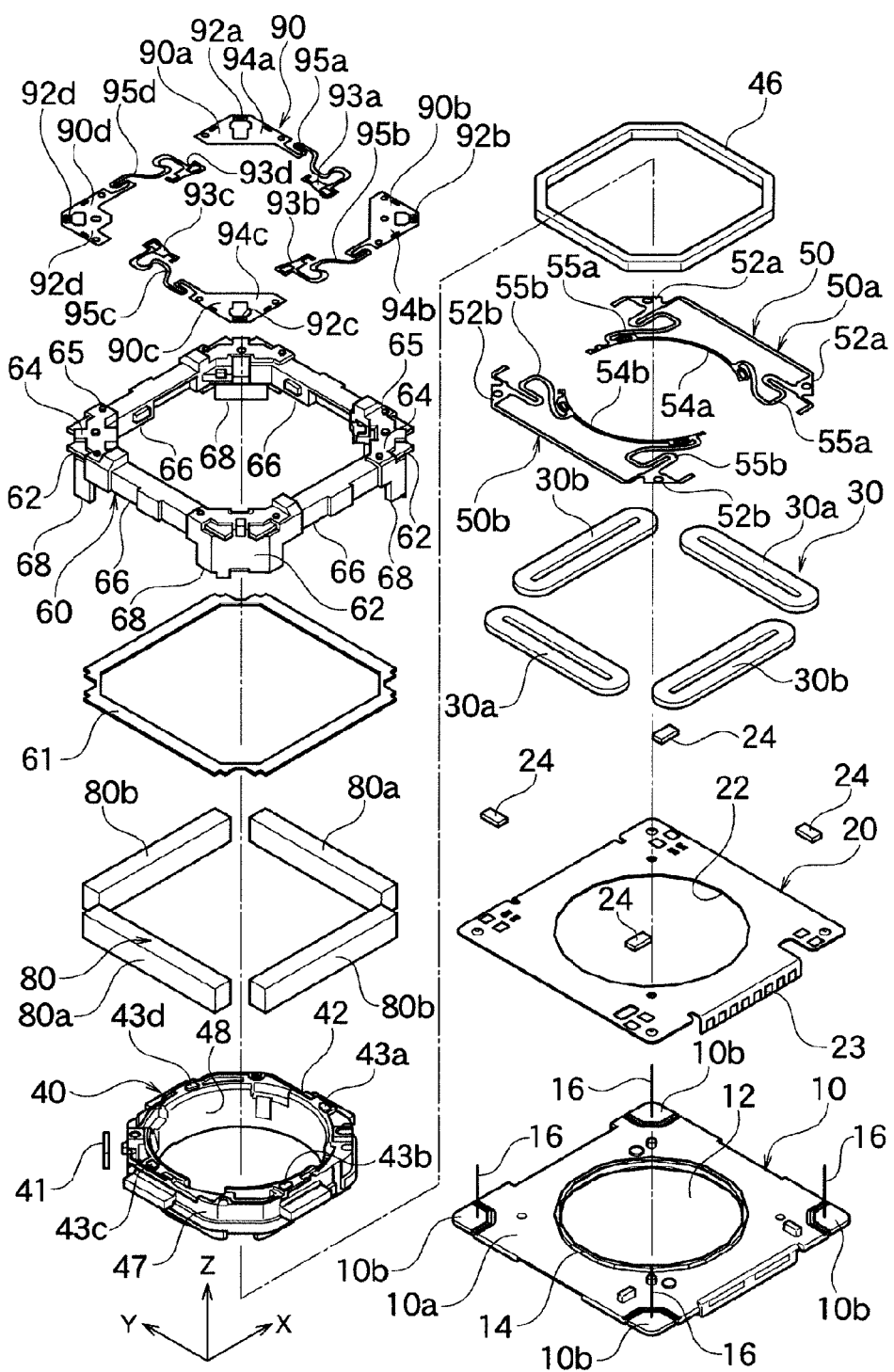
FIG. 2 is the exploded view of the lens driving device wherein the case shown in FIG. 1A is removed.

As shown in FIG. 1A, the lens driving device 2 according to one embodiment of the present invention comprises the case 11 and the base part 10 which functions as the fixing part. The base part 10 and the case 11 are joined at the rear part open end in Z axis direction of the case 11. At the inside of the case 11, as shown in FIG. 1B and FIG. 2, the circuit substrate 20 constituted by FPC or so, the lens holder 40 and the frame 60 are placed towards the front side of Z axis direction of the base part 10. The lens holder 40 and the frame 60 constitute the blur correction movable part against the fixing part.

At the center of the circuit substrate 20, the substrate opening part 22 is formed which penetrates through the front and the back planes. To the substrate opening part 22, the cylinder shape projection part 14 formed at the center of the base part 10 will be inserted. The cylinder shape projection part 14 constitutes the periphery of the opening of the base opening part 12. At the surface (the front plane) of the circuit substrate 20, the blur correction coil 30 is provided along the substrate opening part 22. Note that, the circuit substrate 20 is formed as one body with the base part 10 and constitute a part of the fixing part.

As it will be described in below, the blur correction coil 30 comprises a pair of first driving coils 30a constituting the first driving axis, and a pair of the second driving coils 30b constituting the second driving axis which crosses roughly perpendicularly with the first driving axis. These driving coils 30a and 30b are fixed to the surface of the circuit substrate 20 by an adhesive agent or so.

The circuit substrate 20 has a rectangular shape as a whole, and the connector part 23 for connecting with the outer circuit is formed at one sides of the rectangular shape. Note that, in all of the figures, the direction parallel to the optical axis of the lens 100 (see FIG. 7) capable of being held by the inner peripheral plane 48 of the lens holder 40 is defined as Z axis, and the directions perpendicular to the optical axis (one example of the crossing direction) are defined as X axis direction and Y axis direction.

Note that, X axis, Y axis and Z axis are perpendicular to each other. In the present embodiment, X axis matches the first driving axis, and Y axis matches the second driving axis. Also, the front plane or the front side along Z axis in FIG. 2 and FIG. 7 refers to upward direction, and refers to the image object side with respect to the lens. Also, the rear plane and the rear side along Z axis in FIG. 2 and FIG. 7 refers to the downward direction, and refers to the image sensor side with respect to the lens.

As shown in FIG. 2, the base part 10 comprises the base board main body 10a, and the wire rear end installation corners 10b which is installed at each four corners of the base board main body 10a. For each wire rear end installation corners 10b, the rear end of the single suspension wire 16 is installed. The suspension wire 16 as the supporting part extends towards the front side of Z axis (the upward direction of FIG. 2) by penetrating through the four corners of the circuit substrate 20.

At the front plane 42 of the lens holder 40 shown in FIG. 2, the holder installation parts 93a to 93d of the front side spring 90 are installed and fixed. At a part of the outer circumference plane 47 of the lens holder 40 along the circumferential direction, the sensor part 41 is installed. The sensor part 41 is constituted by hall IC component or so which detects, for example, the relative movement of the hall element (hall magnet), and detects the relative position in Z axis direction of the lens holder 40 with respect to the frame 60. At the inner plane of the frame 60 corresponding to the sensor part 41, the hall magnet is provided which is omitted in the figures.

In the present embodiment, the sensor component 41 is installed to the lens holder 40, hence the position in Z axis direction of the lens holder 40 against the frame 60 can be accurately detected in a real time manner, and based on the detected result, and the lens holder is driven in Z axis direction. Therefore, accurate and quick AF driving is achieved. Note that, for such controlling, particularly when the frame 60 makes the resonance in Z axis direction, the lens holder 40 is driven based on the detected signal by the sensor component 41, hence the vibration may be increased. In the present embodiment, such situation can be effectively prevented by the vibration absorbing member 70c alone (or by the combined effect with 70b, or with 70c).

The front side spring 90 as the resilient member is constituted by four divisional plate springs 90a to 90d which are separated and insulated against each other. Each divisional plate springs 90a to 90d comprises wire installation parts 92a to 92d (the support installation part) to which the front end of the suspension wire 16 is installed. The suspension wire 16 and the divisional plate springs 90a to 90d are constituted by the conductive material such as metals, and these can be electrically connected.

The suspension wire 16 can deflect resiliently along the driving plane which includes X axis and Y axis. Note that, in case an excessive force is applied to the suspension wire 16, it is possible to deform resiliently along Z axis direction; however in the usual lens driving function, the suspension wire 16 freely deflect resiliently along the driving plane which includes X axis and Y axis. In order for the front end of the suspension wire 16 to be easily connected to each wire installation parts 92a to 92d of each divisional plate springs 90a to 90d, as shown in FIG. 4A, notch parts 62 are provided respectively to four corner parts of the frame 60.

Each divisional plate springs 90a to 90d comprises frame installation parts 94a to 94d respectively which are continuous with the respective wire installation parts 92a to 92b. Each frame installation parts 94a to 94d is for example installed and fixed at four corner parts positioned at the front plane 64 of the frame 60 having the square ring shape as shown in FIG. 4A. The frame 60 itself is constituted by the insulation material such as plastic or so.

Figure 4A:
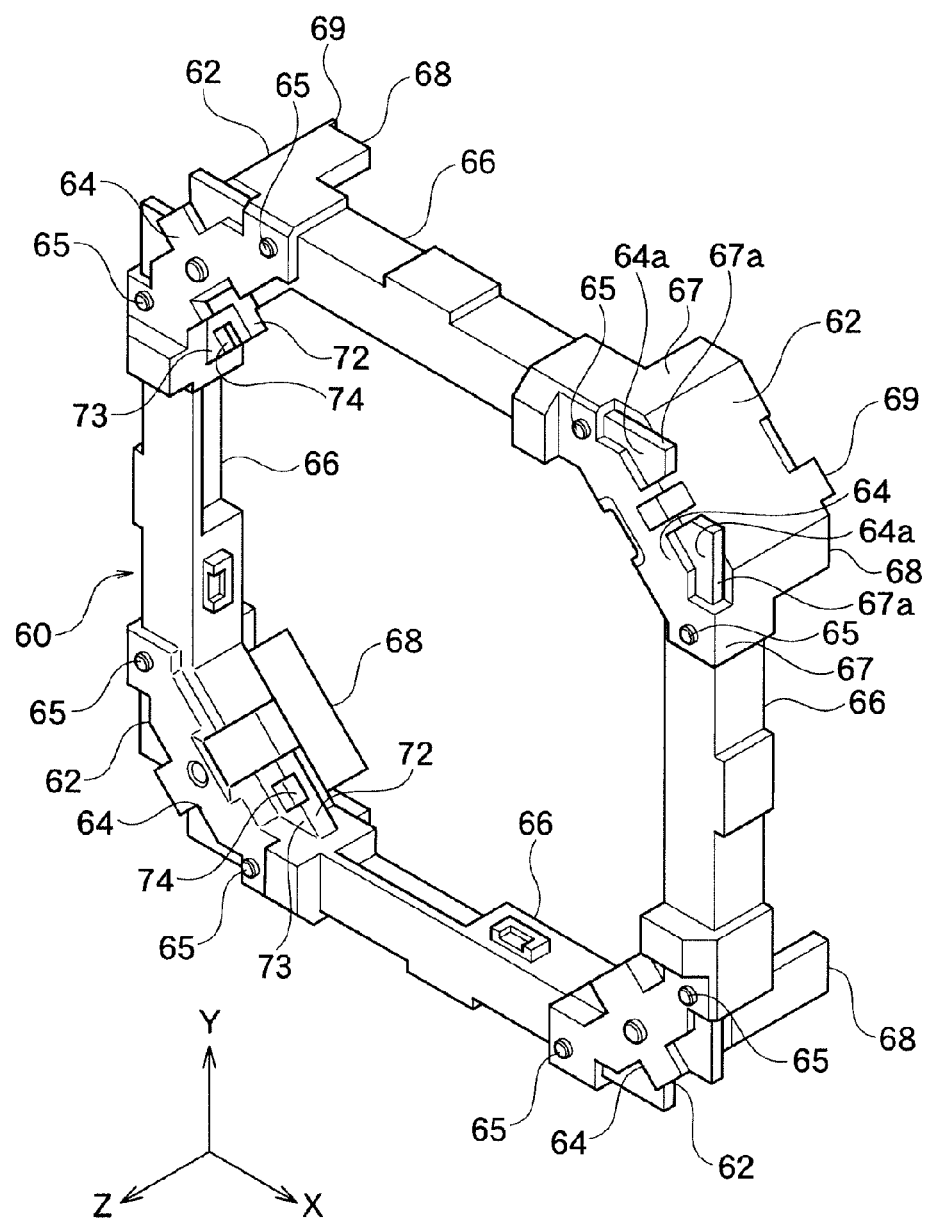
FIG. 4A is the perspective view of the frame shown in FIG. 2.

As shown in FIG. 4A, at the front plane positioned at the corner part of the frame 60, preferably plurality of installation projection parts 65 are formed. Each installation projection parts 65 fits to the fitting hole formed at the frame installation parts 94a to 94d of the divisional plate springs 90a to 90d as shown in FIG. 1B and FIG. 2, and each installation projection parts 65 are fixed by determining the position of the divisional plate springs 90a to 90d on the frame 60. The back sides of each of the divisional plate springs 90a to 90d are fixed by adhering to the front plane 64 position at the corner part of the frame 60. For fixing by adhering, the adhesive agent may be used.

Figure 3A:
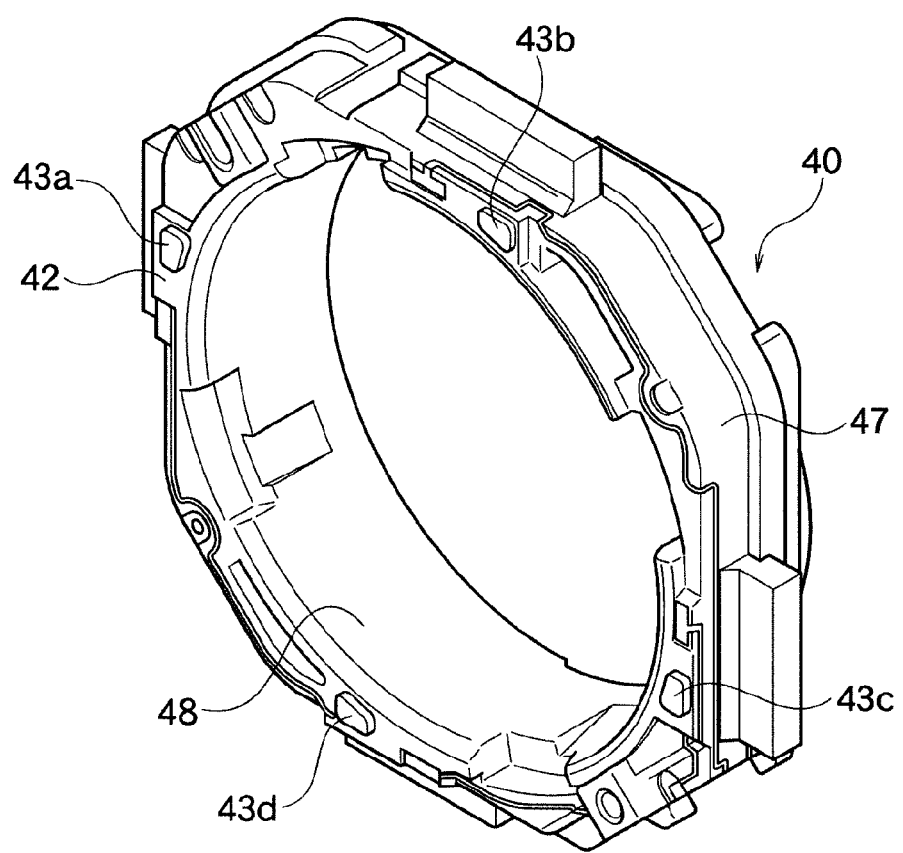
FIG. 3A is the perspective view of the lens holder shown in FIG. 2.

At frame installation parts 94a to 94d of each divisional plate springs 90a to 90d, the holder installation parts 93a to 93d are formed respectively via the meandering parts 95a to 95d. At the holder installation parts 93a to 93d, the fitting holes are respectively formed. The fitting holes fit to the installation projection parts 43a to 43d which are formed roughly equally along the circumferential direction of the front plane 42 of the lens holder 40 as shown in FIG. 3A.

That is, as the meandering parts 95a to 95d deforms resiliently, by the holder installation parts 93a to 93d formed at the inner peripheral edge of the front side spring 90, the front side spring 90 holds the lens holder 40 in a movable manner along Z axis direction which is the optical axis direction with respect to the frame 60.

Further, each divisional plate springs 90a to 90d of the front side spring 90 are connected to different suspension wire 16 respectively, and also connects to the wire pattern formed on the front plane of the lens holder 40. Therefore, the driving current is supplied to the focusing coil 46 held by the lens holder via the suspension wire 16 and the front side spring 90, and also the detected signal by the sensor part 41 is transmitted to the circuit substrate 20. Each suspension wire 16 can be electrically connected to the wire pattern of the circuit substrate 20. That is, using four suspension wires 16 made of the conductive member, and four divisional plate springs 90a to 90d made of the conductive member, four conductive pathways towards the lends holder 40 from the circuit substrate 20 which is the fixing part can be formed.

Figure 3B:
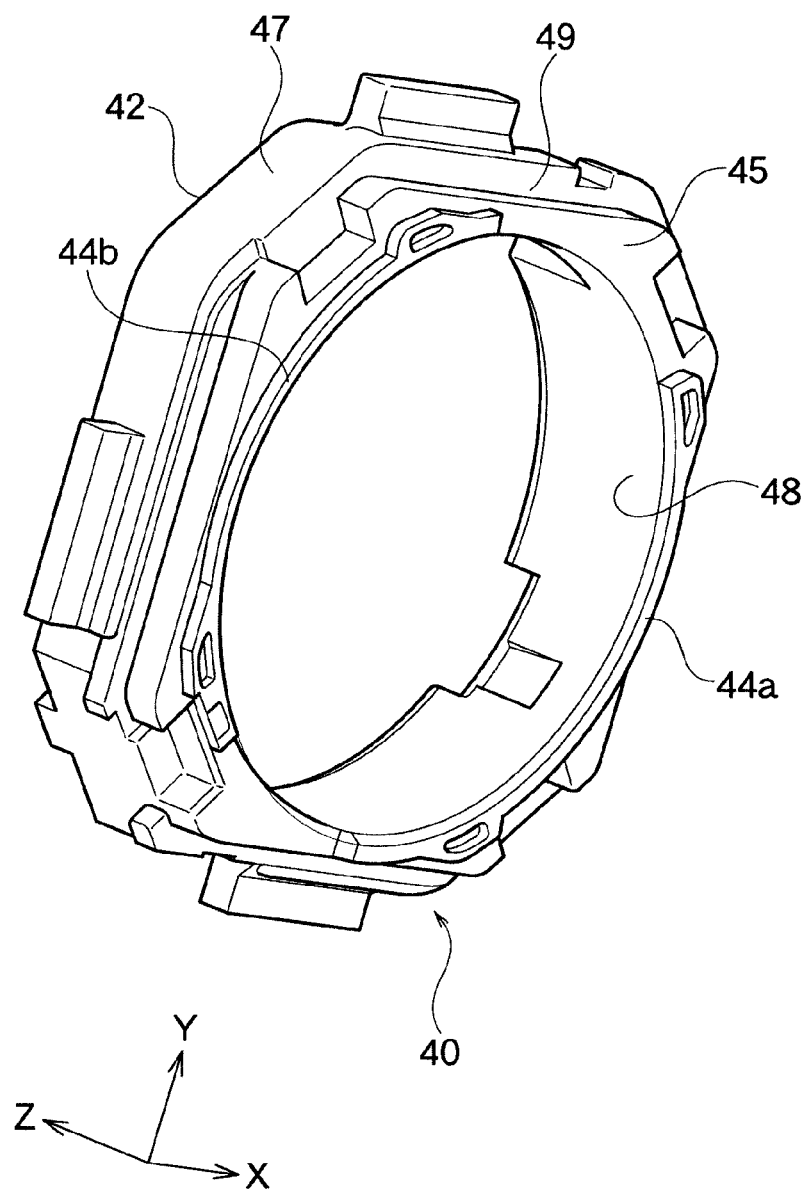
FIG. 3B is the perspective view of the lens holder shown in FIG. 3A looking from the different angle.

As shown in FIG. 3B, at the rear plane 45 of the lens holder 40, the plate spring installation parts 44*a* and 44*b* having the arc shape are formed. Also, at the back side of the outer circumference plane 47 of the lens holder 40, the step part 49 is formed. At the step part 49, the square ring shape focusing coil 46 shown in FIG. 2 is fixed.

As shown in FIG. 2, the rear side spring 50 is constituted by a pair of the divisional plate springs 50*a* and 50*b*. For each divisional plate springs 50*a* and 50*b*, the holder installation parts 54*a* and 54*b* having the arc shape are formed at each of the inner circumference parts thereof. Each holder installation parts 54*a* and 54*b* are fixed to the plate spring installation parts 44*a* and 44*b* as shown in FIG. 3B. As for the means of fixing the rear side spring 50 to the plate spring installation parts 44*a* and 44*b*, it is not particularly limited, and for example fixing by fitting or by adhesive agent or so may be mentioned.

As shown in FIG. 2, at each divisional plate springs 50*a* and 50*b* of the rear spring 50, the meandering parts 55*a* to 55*b* are formed continuously with the both end parts of the holder installation parts 54*a* and 54*b*; and at the outer circumference side of the meandering parts 55*a* and 55*b*, the frame installation parts 52*a* and 52*b* are formed continuously. Each frame installation parts 52*a* and 52*b* are fixed to the corner part rear plane 68 of the frame 60 by fitting.

That is, similar to the front side spring 90, because the meandering parts 55*a* to 55*d* deforms resiliently, the rear side spring 50 holds the lens holder 40 in a movable manner along Z axis direction which is the optical axis direction with respect to the frame 60, by the holder installation parts 54*a* to 54*d* formed at the inner circumference end. Note that, the rear side spring 50 does not necessarily need the electrical conductive pathway function, which is different from the front side spring 90.

Figure 4B:
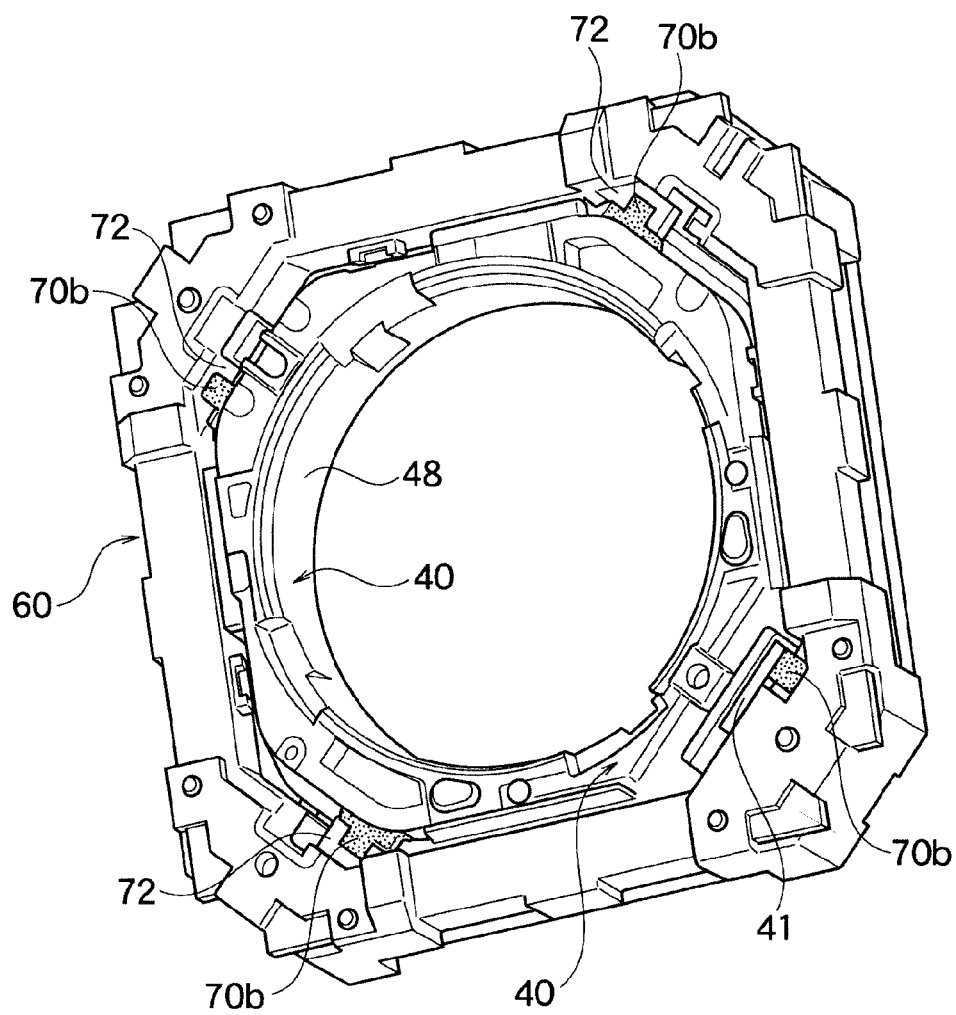
FIG. 4B is the perspective view of the frame shown in FIG. 4A looking from the different angle.

As shown in FIG. 4A and FIG. 4B, at the back side in Z axis direction of the square ring shape frame 60, the magnet installation depression parts 66 are formed along the four sides of the square. At the magnet installation depression parts 66, as shown in FIG. 2 and FIG. 7, the magnet 80 is fixed via the magnetic board 61.

Figure 7:
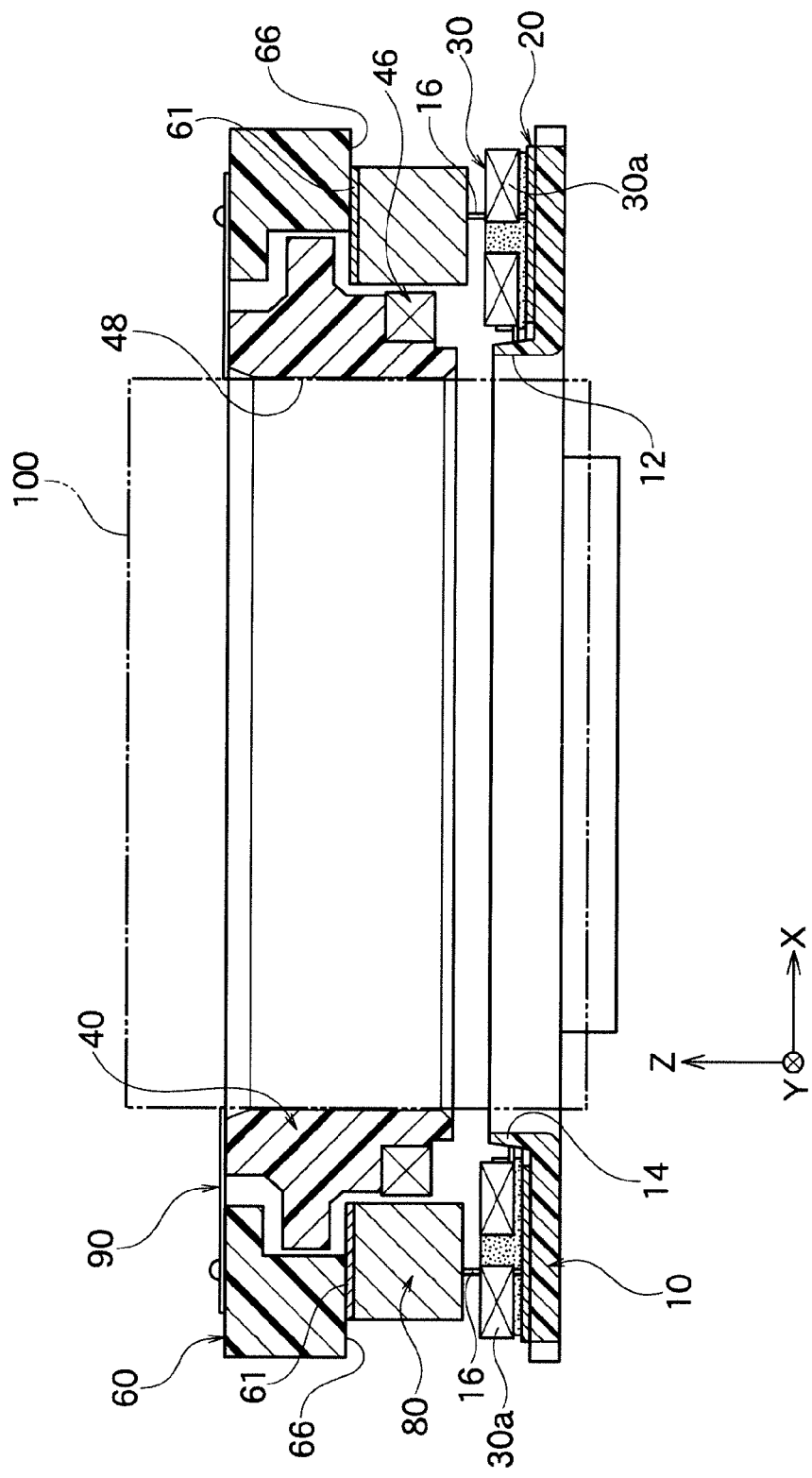
FIG. 7 is the cross section view along VII-VII line shown in FIG. 6B, and it is the cross section view wherein the frame and the lens holder are assembled on the upper part along Z axis direction of the partial assembly figure of FIG. 6B.

As shown in FIG. 7, the frame 60 is held to the base part 10 by the suspension wire 16 so that the space (the driving space) is formed between the rear plane of the magnet 80 and the front plane of the blur correction coil 30. The frame 60 is held in a movable manner along the driving plane which includes X axis and Y axis with respect to the base part 10.

At the frame 60, the lens holder 40 is held in a movable manner along Z axis direction via the front side spring 90 and the rear side spring 50 as shown in FIG. 2, therefore together with the frame 60, the lens holder 40 also moves along the driving plane which includes X axis and Y axis with respect to the base part 10.

By allowing the driving current to flow to the blur correction coil 30, due to the combined effect of the coil 30 and the magnet 80, the force along the perpendicular direction with the optical axis acts on the magnet 80. Therefore, together with the lens holder 40, the frame 60 can move along the driving plane which includes X axis and Y axis, with respect to the base part 10. By moving the lens 100 with the lens holder 40 along the driving plane, the blur correction can be done.

Also, since the space is formed between the inner circumference plane of the magnet 80 and the outer circumference plane of the focusing coil 46, the lens holder 40 is held by the frame 60 via the springs 90 and 50 (see FIG. 2). By allowing the driving current to flow to the focusing coil 46, the combined effect (VCM effect) of the coil 30 and the magnet 80, and the force along the optical axis direction acts on the coil 46. Therefore, the lens 100 with the lens holder 40 can move back and forth along the optical axis direction with respect to the frame 60. By moving the lens 100 with the lens holder 40 along the optical axis direction with respect to the frame 60, the autofocus (AF) operation can be carried out.

In the present embodiment, the magnet 80 functions both as the AF control magnet and the blur correction control magnet, thereby the number of the parts can be reduced, and hence AF control and blur correction control can be carried out by a simple constitution. Further, it can contribute to achieve a compact lens driving device 2.

Note that, the lens 100 may be constituted by plurality of the lens groups; however in order to make the explanation simple, the embodiment of using one lens will be used for describing the present embodiment.

Figure 6A:
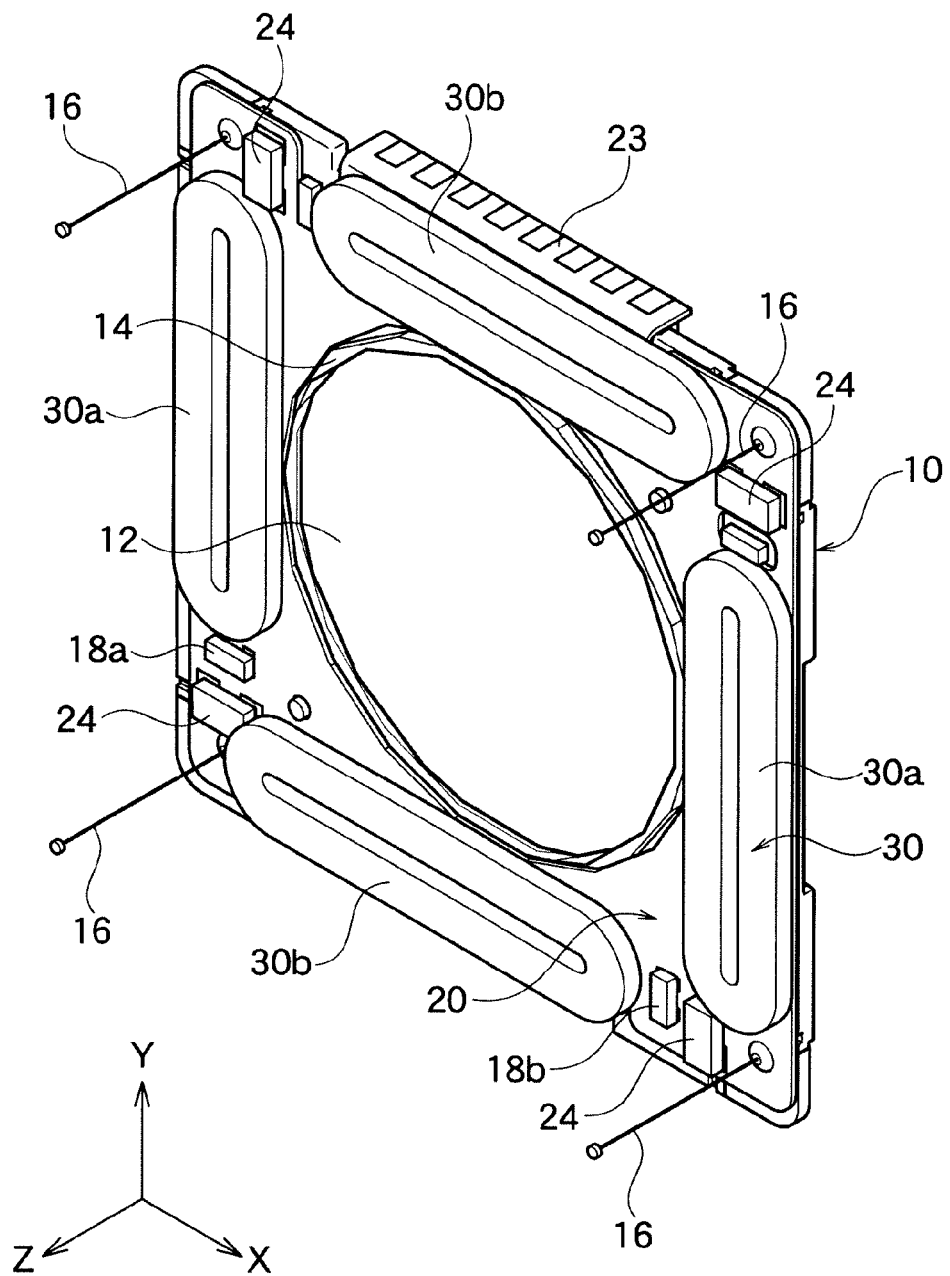
FIG. 6A is the perspective view of the partial assemble figure wherein the circuit substrate and the driving coil are placed on the base part shown in FIG. 5A.
Figure 6B:
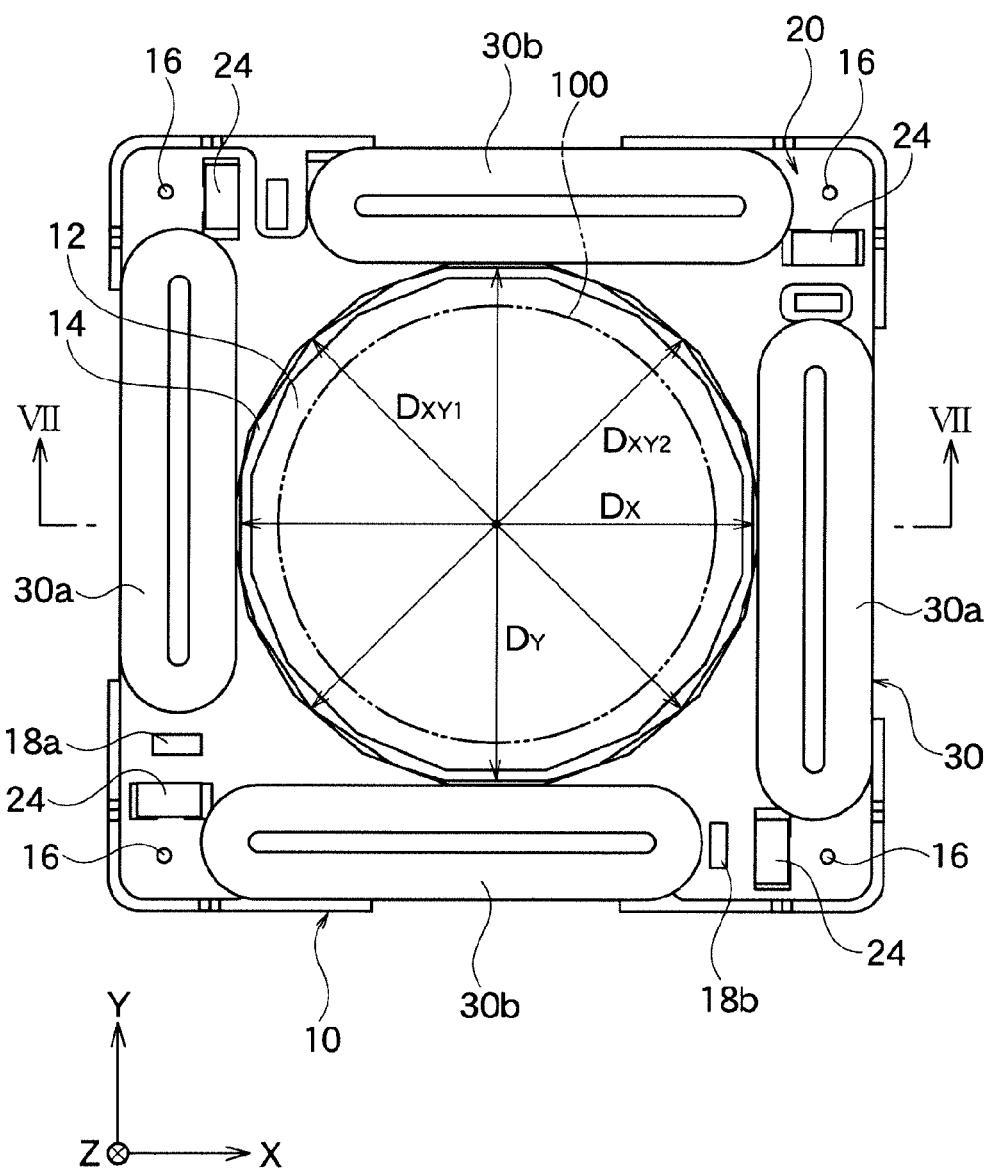
FIG. 6B is the enlarged top view of FIG. 5A, and it shows the relation between the lens and the opening part.

As shown in FIG. 6A and FIG. 6B, the blur correction coil 30 comprises a pair of first driving coils 30*a* and 30*a* which are opposing against each other by placing the opening part 12 in between along X axis direction, and a pair of the second driving coils 30*b* and 30*b* which are opposing against each other by placing the opening part 12 in between along Y axis direction. These driving coils 30*a* and 30*b* are placed, on the front plane of the circuit substrate 20 of the square board shape as a whole, and are placed parallel along each sides of the circuit substrate 20 so as to surround the cylinder shape projection part 14.

The position of placement along Y axis direction of the first driving coils 30*a* and 30*a* opposing against each other along X axis directions is slightly off positioned; and the position of placement along X axis direction of the second driving coils 30*b* and 30*b* opposing against each other along Y axis directions is slightly off positioned as well. The driving coils 30*a* and 30*b* are slightly off positioned along the circumference direction as such because this allows the position sensors 18*a* and 18*b* and the dumper table (pedestal) 24 to be mounted easily on the four corners of the circuit substrate 20, and also to easily form the through hole or so for the suspension wire 16.

The position sensor 18*a* is, for example, constituted by the hall sensor. The position sensor 18*a* and one of the first driving coils 30*a* together face against the rear plane of one of the first driving magnet 80*a* of the magnet 80 shown in FIG. 2, while taking predetermined space with the first driving magnet 80*a*; thereby the moving position along X axis direction of the first driving magnet 80*a* can be detected. Also, the position sensor 18*b* is, for example, constituted by the hall sensor. The position sensor 18*b* and one of the second driving coils 30*b* together face against the rear plane of one of the second driving magnet 80*b* of the magnet 80 shown in FIG. 2 while taking predetermined space with the second driving magnet 80*b*; thereby the moving position along Y axis direction of the first driving magnet 80*b* can be detected. These sensors 18*a* and 18*b* are electrically connected to the wire pattern of the circuit substrate 20.

In the present embodiment, the first driving coil 30*a* and the first driving magnet 80*a* are placed along Z axis direction while taking a predetermined space and facing against each other to constitute the first driving part (the first VCM) for the blur correction. The second driving coil 30*b* and the second driving magnet 80*b* are placed along Z axis direction while taking a predetermined space and facing against each other to constitute the second driving part (the second VCM) for the blur correction. The first driving axis of the first driving part is X axis, and the second driving axis of the second driving part is Y axis. The first driving part and the second driving part constitute the crossing direction driving part.

The damper tables (pedestals) 24 shown in FIG. 6A and FIG. 6B are respectively fixed to four corners of the circuit substrate 20 by means of the adhesive agent or by reflow or so. The damper table 24 is for example constituted by the chip component such as ceramic electronic components or so.

Figure 1C:
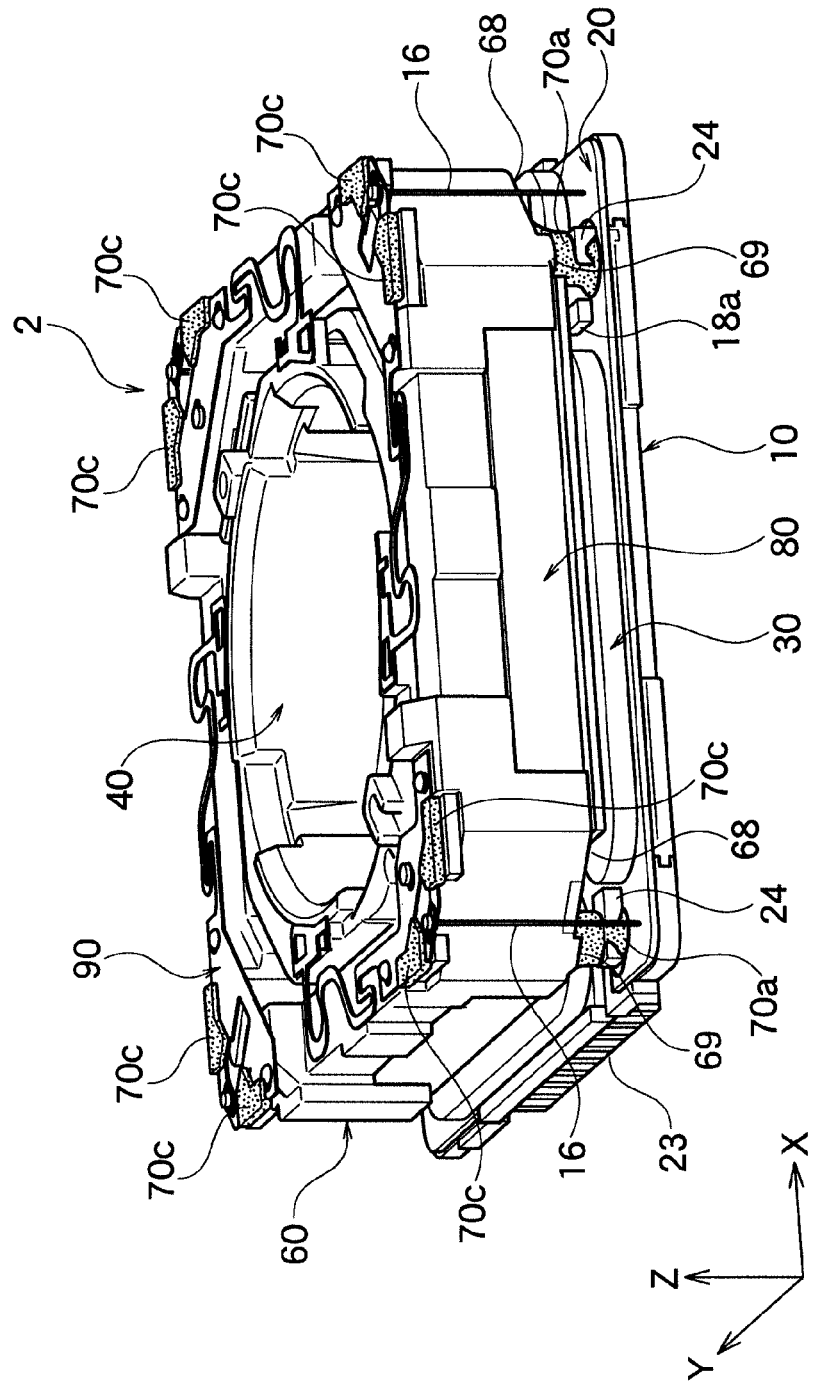
FIG. 1C is the perspective view of the entire lens driving device without the case as shown in FIG. 1B but looking from the different angle.
Figure 1D:
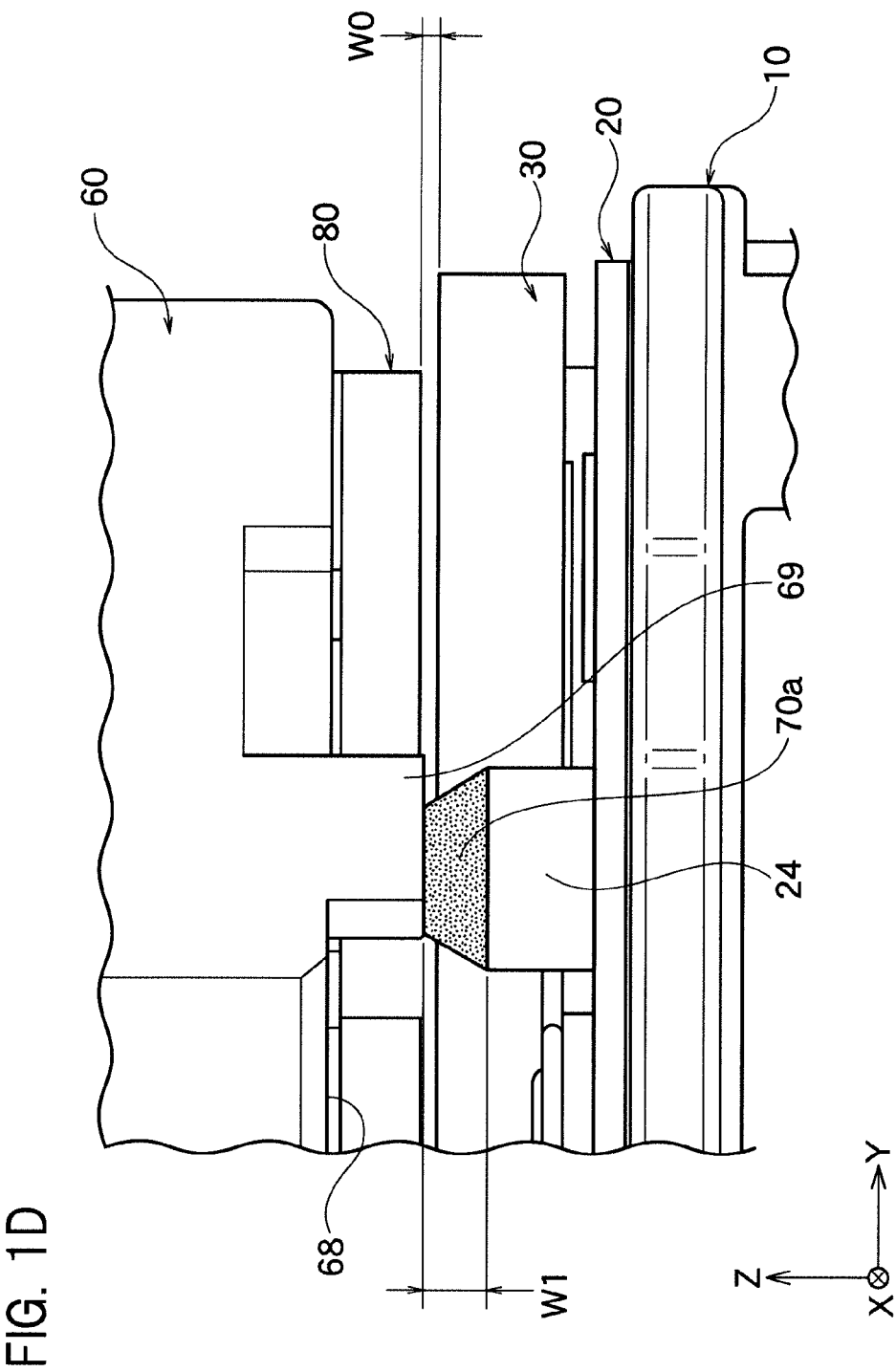
FIG. 1D is the partial enlarged schematic view showing the damper material filled between the pedestal and the rear plane of the frame shown in FIG. 1C.

As shown in FIG. 1C and FIG. 1D, between the front plane of the damper table 24 and the corner part rear plane 68 or the rear plane projection part 69 of the frame 60, the space (the first damper space) having the space width W1 is formed; and the first damper material (the vibration absorbing member) 70a of gel form is present in this first damper space so as to adhere to the both. The space width W1 is wider than the space width W0 which is the space (the driving space) between the magnet 80 and the blur correction coil 30, and specifically the space width W1 is preferably 0.1 to 0.4 mm or so.

The first damper material 70a is for example constituted by a vibration absorbing material such as a soft gel material or a soft adhesive agent or so. The first damper material 70a functions as the damper when the frame 60 moves long the driving plane which includes X axis and Y axis with respect to the base 10 and the circuit substrate 20, and thus the suppression of the vibration can be expected. In case the first damper material 70a is constituted by the ultraviolet ray curing resin or so, the viscosity of the first damper member 70a is for example 10 to 100 Pa·s, however it is not particularly limited.

Figure 1E:
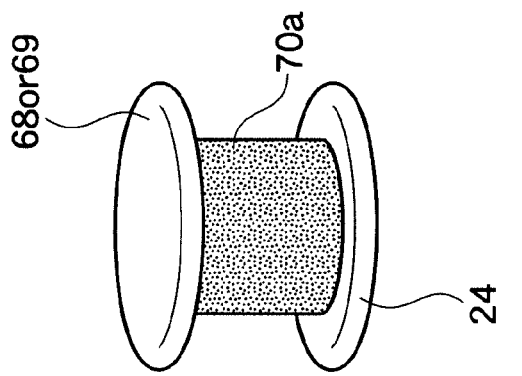
FIG. 1EA to FIG. 1EC are the partial enlarged schematic views showing modification examples of the first damper material.

As shown in FIG. 1EA, in the present embodiment, the contact area of the first damper material 70a on the upper plane of the damper table 24 is preferably larger than the contact area of the first damper material 70a at the lower plane of the corner part rear plane or rear plane projection part 69 of the frame 60. Also, as shown in FIG. 1EC, the contact area of the first damper material 70a at the upper plane of the damper table 24 may be roughly the same as the contact area of the first damper material 70a at the lower plane of the corner part rear plane or rear plane projection part 69 of the frame 60. However, as shown in FIG. 1EB, the contact area of the first damper material 70a at the upper plane of the damper table 24 may be smaller than the contact area of the first damper material 70a at the lower plane of the corner part rear plane or rear plane projection part 69 of the frame 60.

In the present embodiment, the first damper material 70a is not placed between the magnet 80 and the coil 30, but it is placed between the damper table 24 and the corner part rear plane 68 of the frame 60, or between the damper table 24 and rear plane projection part 69 of the frame 60. Furthermore, the space width W1 is wider than the space width W0. Therefore, in the present embodiment, even if the impact is applied such as dropping the portable devices or so including the lens driving device 2, the magnet 80 and the coil 30 will collide; thereby the stopper function comes into effect. Therefore, the first damper material 70a can be held between the damper table 24 and the corner part rear plane 68 of the frame 60, or between the damper 24 and rear plane projection part 69 of the frame 60; hence the damper characteristic can be maintained in good condition even after the impact.

Figure 4C:
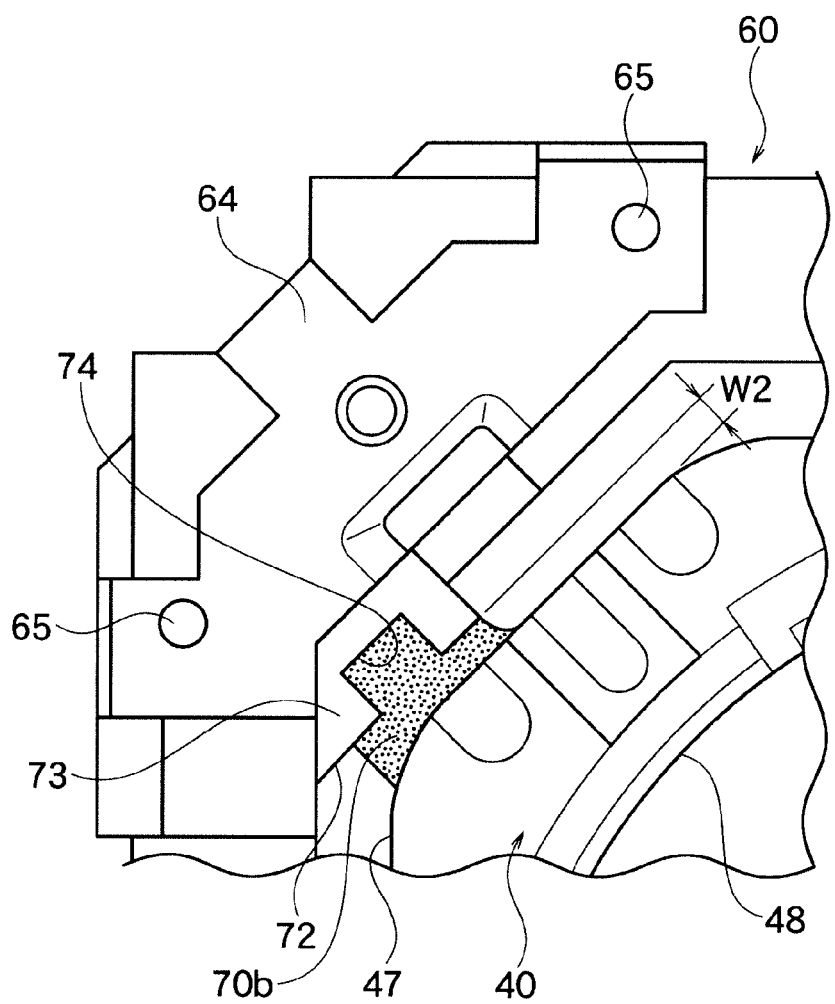
FIG. 4C is the perspective view wherein the frame and the lens holder shown in FIG. 2 are joined.
Figure 4D:
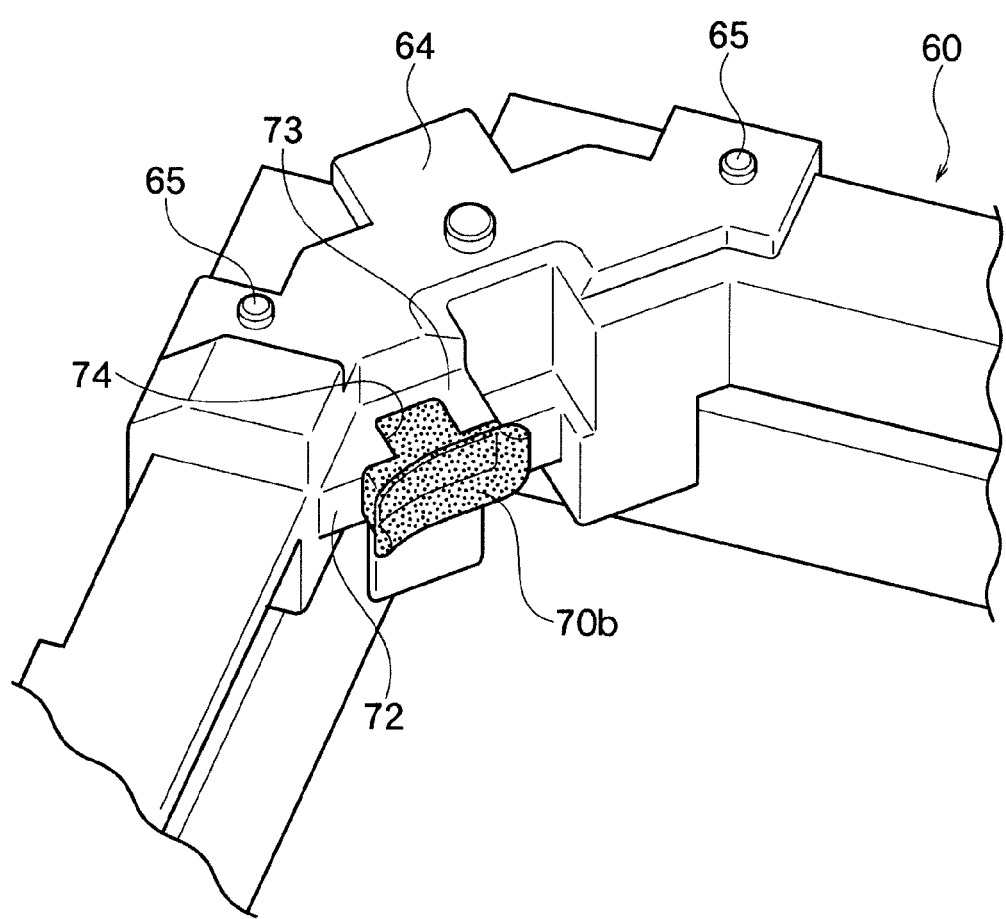
FIG. 4D is the partial enlarged figure of the essential part of the frame and the lens holder shown in FIG. 4C.

Also, in the present embodiment, as shown in FIG. 4A to FIG. 4E, at inner side of each four corner of the frame 60, the inner side projection parts 72 are formed which project towards the inside. As shown in FIG. 4D, the width W2 between the inner side projection part 72 and the outer circumference plane 47 of the lens holder 40 is preferably 0.1 to 0.3 mm or so. At the space (the second damper space) having this width W2, the second damper material 70b is filled; and in this space, the second damper material 70b adheres to the inner side projection part 72 and to the outer circumference plane 47 of the lens holder 40. The second damper material 70b is constituted by similar material as the first damper material 70a, but it does not have to be exactly the same.

Figure 4E:
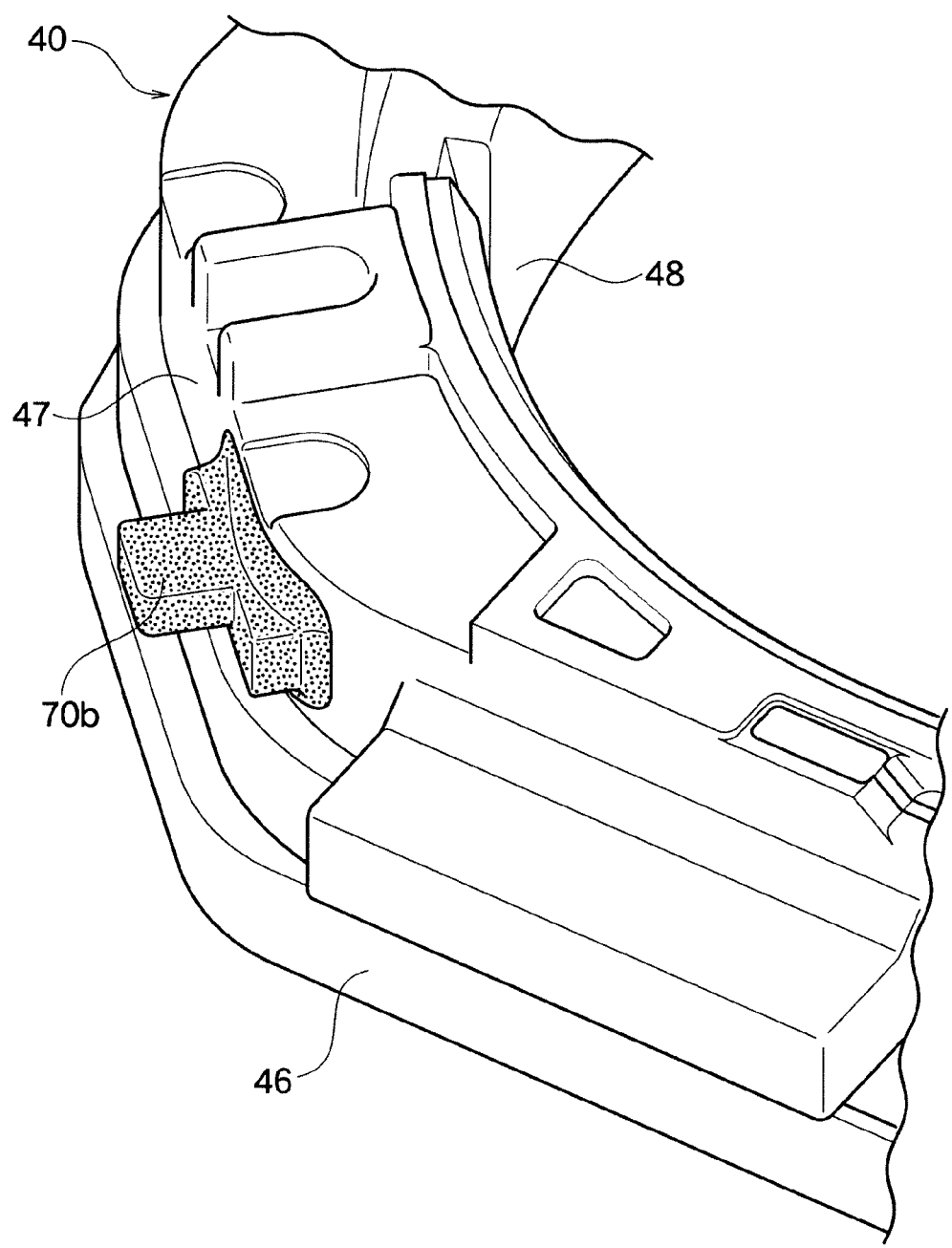
FIG. 4E is the partial enlarged figure of the essential part only of the frame shown in FIG. 4C.

As shown in FIG. 4E, at the front plane 73 of the inner side projection part 72, the damper depression part 74 is formed. The second damper material 70b is filled in this damper depression part 74 and in the space. The second damper material 70b in the space and the second damper material 70b filled in this damper depression part 74 are continuous. The second damper material 70b in the damper depression part 74 functions as the gel reservoir which can provide the damper material to the space, thus even if the impact is applied to the lens driving device 2, the risk of the second damper material 70b slipping out of the space is low.

The second damper material 70b functions as the damper when the lens holder 40 is focus driving along the optical axis direction (Z axis direction) with respect to the frame 60, thereby the suppression of the vibration can be expected. In the present embodiment, by providing the second damper material 70b near the four corner parts of the frame 60 of the square shape, the damper materials 70b at the four positions can be placed at the position furthest from the center axis (optical axis) of the lens, thus the function as the damper can be fully exhibited. Note that, as shown in FIG. 4C, one of the damper materials 70b at the four positions may be provided at the space between the sensor component 41 installed at the part of the lens holder 40, and the inner circumference plane of the frame 60.

In the present embodiment, as shown in FIG. 6B, at the base part 10B, the opening part 12 is formed wherein a part of the lens 100 is to be inserted in a movable manner along the driving plane which includes the first driving axis (X axis) and the second driving axis (Y axis). In the present embodiment, the oblique inner diameter Dxy1 and Dxy2 of the opening part 12 along the oblique direction positioned at the middle of the first driving axis (X axis) and the second driving axis (Y axis), is larger than the first inner diameter Dx along X axis direction of the opening part 12, and also larger than the second inner diameter Dy along Y axis direction of the opening part 12.

In the present embodiment, the first inner diameter Dx and the second inner diameter Dy are roughly the same. Also, the oblique inner diameter Dxy1 and Dxy2 are roughly the same with respect to each other. The oblique inner diameter Dxy1 and Dxy2 have the maximum length at near the bisector of the crossing angle between the straight line along the first inner diameter Dx and the straight line along the second inner diameter Dy; and as getting closer to the straight line along the first inner diameter Dx or the second inner diameter Dy, the oblique inner diameter Dxy1 and Dxy2 approach the first inner diameter Dx and the second inner diameter Dy.

In the present embodiment, the opening part 12 has n-polygonal shape; and the maximum value of the oblique inner diameter Dxy1 and Dxy2 are within 45 degrees (½ of the crossing angle of X axis and Y axis)±(360/n) with respect to X axis and Y axis. Note that, the shape of the inner circumference plane of the opening part 12 is not limited to polygonal shape, and it may be a curved shape. In such case, the maximum value of the oblique inner diameter Dxy1 and Dxy2 are within 45 degrees (½ of the crossing angle of X axis and Y axis)±15 degrees with respect to X axis and Y axis.

The inner diameter of the opening part 12 continuously changes or changes in a stepwise manner from the position where the oblique inner diameter Dxy1 and Dxy2 take the maximum value, to the first inner diameter Dx or the second inner diameter Dy. Note that, it may simply decrease from the maximum value of the oblique inner diameter Dxy1 and Dxy2 towards the first inner diameter Dx or the second inner diameter Dy; or it may approach towards the first inner diameter Dx or the second inner diameter Dy while repeating increase and decrease. The maximum value of the oblique inner diameter Dxy1 and Dxy2 are preferably 1.02 to 1.05 times of the first inner diameter Dx or the second inner diameter Dy.

In the lens driving device 2 according to the present embodiment, as shown in FIG. 6B, the oblique inner diameters Dxy1 and Dxy2 of the opening part 12 along the oblique direction positioned at the middle of X axis and Y axis is larger than the first inner diameter Dx along X axis direction of the opening part 12, and also larger than the second inner diameter Dy along Y axis direction of the opening part 12. By taking such constitution, not only in case of moving the lens 100 along X axis direction or Y axis direction, but also in case of moving along the oblique direction in middle thereof, there is no risk of the lens 100 to collide against the inner circumference plane of the cylinder shape projection part 14 constituting the periphery of the opening part 12.

Further, for the lens driving device 2 according to the present embodiment, the opening part 12 formed at the base part 10 is not a perfect circle, and has an atypical shape wherein the inner diameter Dxy1 and Dxy2 along the oblique direction positioned between X axis direction and Y axis direction is larger than the inner diameter in X axis direction or Y axis direction. Therefore, compared to the opening part having the perfect circle shape which was determined based on the maximum moving amount towards the oblique direction, the size of the base part 10 can be made small, thus this contributes to make the device compact. Particularly, as shown in FIG. 6B, along the oblique direction which crosses with X axis and Y axis, there is still a space left, hence even if the inner diameter of the opening part 12 is enlarged in such direction, there is no need to enlarge the size of the base part 10 and the circuit substrate 20.

Also, if the size of the base part 10 and the circuit substrate 20 is the same, compared to the opening part having the perfect circle shape which was determined based on the maximum moving amount towards the oblique direction, in the present embodiment, the base part 10 can be enlarged but excluding the opening part 12 along X axis and Y axis. Therefore, the number of windings of the first driving coils 30a and the second driving coils 30b can be increased, hence the driving force is enhanced, and the accuracy of the blur correction is improved.

Further, in the present embodiment, the first driving part includes a pair of the first driving coils 30a positioned along X axis direction while placing the opening part 12 therebetween; and a pair of the first driving coils 30a are placed parallel along opposing two sides of the base 10. By taking such constitution, the driving force along X axis direction is enhanced and the accuracy of the blur correction improves.

Also, the second driving part includes a pair of the second driving coils 30b positioned along Y axis direction while placing the opening part 12 therebetween; and a pair of the second driving coils 30b are placed parallel along opposing two sides of the base 10. By taking such constitution, the driving force along Y axis direction is enhanced and the accuracy of the blur correction improves.

Further, as shown in FIG. 4A, the frame 60 has a square ring shape as a whole; and as shown in FIG. 1, the frame 60 is placed inside of the case 11 having the square cylinder shape which is fixed to the base 10, and the oblique direction roughly matches the direction of the diagonal line of the square ring shape. By taking such constitution, as shown in FIG. 6B, the first driving coils 30a and the second driving coils 30b can be placed efficiently on the base part 10 excluding the opening part 12, hence the size of the base part 10 can be made small, and therefore the device 2 can be compact.

Further, in the present embodiment, as shown in FIG. 6B, the cylinder shape projection part 14 is formed at the base part 10 along the periphery of the opening part 12; and the first driving coils 30a and the second driving coils 30b are placed around the cylinder shape projection part 14. By taking such constitution, the first driving coils 30a and the second driving coils 30b placed around the cylinder shape projection part 14 can be effectively prevented from colliding against the lens 100.

Also, by having the cylinder shape projection part 14, the dusts or so present on the surface of the base part 10 and the circuit substrate 20 becomes difficult to enter to the inside of the opening part 12. The lens 100 is inserted at the inside of the opening part 12, and the image sensor or so is placed at the rear position along the optical axis direction of the lens 100. If the dusts or so adheres to the image sensor, the quality of the images to be taken may decline, thus the dusts or so does not preferably enter inside the opening part 12.

Figures 5A, 5B, 5C:
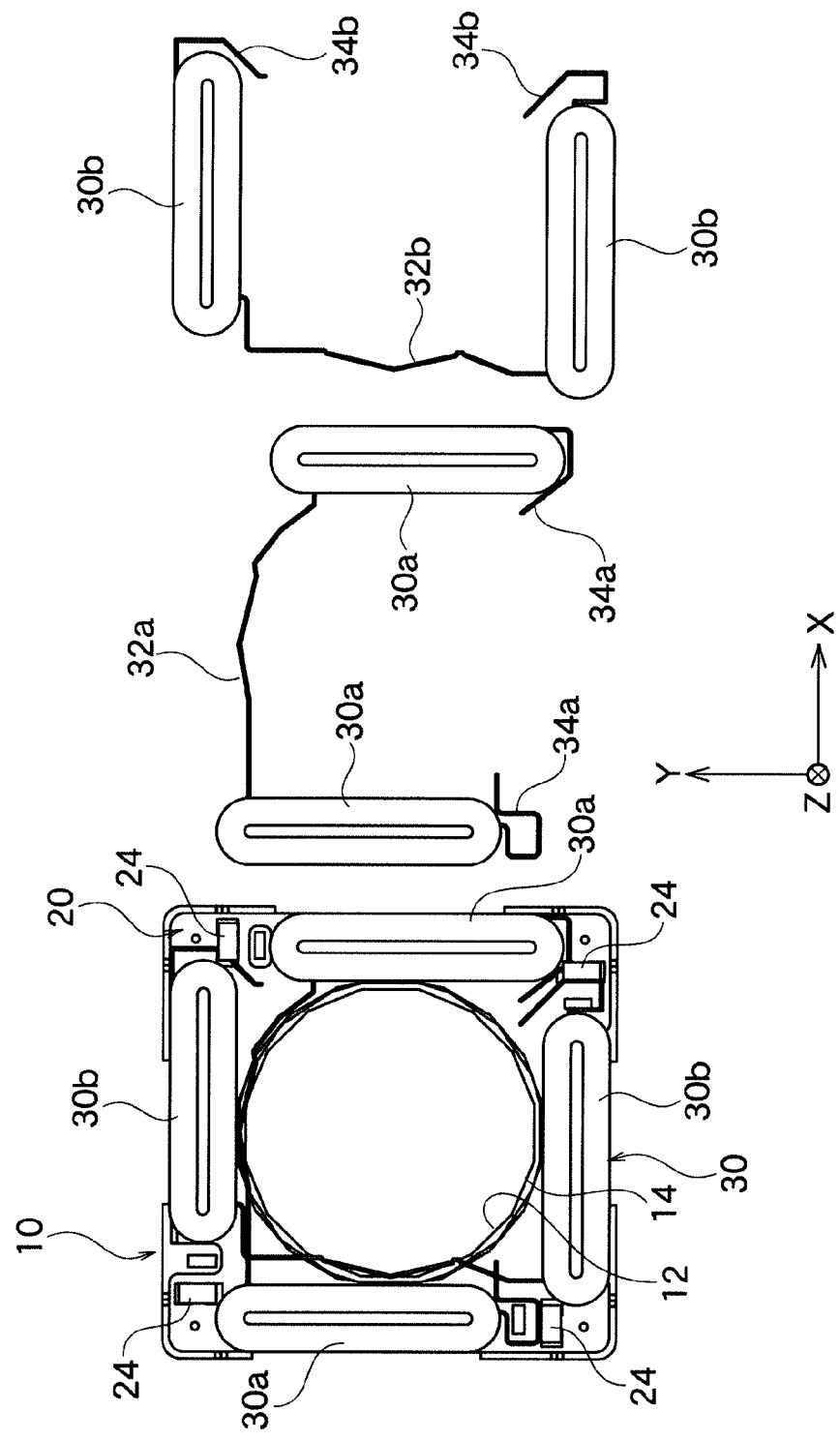
FIG. 5A is the top view of arranging the circuit substrate and the driving coil on the base part shown in FIG. 2.
FIG. 5B is the top view of the first driving coil shown in FIG. 5A.
FIG. 5C is the top view of the second driving coil shown in FIG. 5A.

Further, as shown in FIG. 5A to FIG. 5C, by having the cylinder shape projection part 14, the wires 32a which connects a pair of the first driving coils 30a, and the wires 32b which connects a pair of the second driving coils 30b can be easily placed along the outer circumference plane of the cylinder shape projection part 14. Also, by efficiently using the corner space between the cylinder shape projection part 14 and each driving coils 30a and 30b, the lead wires 34a and 34b of the driving coils 30a and 30b respectively can be easily connected to the circuit pattern of the circuit substrate 20.

Particularly, in the lens driving device 2 according to the present embodiment, the coil is not embedded into the coil substrate, but the first driving coil 30a and the second driving coil 30b are fixed to the front plane of the circuit substrate 20 as the fixing part. Thereby, the number of winding of the driving coils 30a and 30b can be easily increased, and thus the driving force of the driving coils 30a and 30b can be enlarged.

In the lens driving device according to the present embodiment, the damper table 24 as the pedestal is provided at the front plane of the circuit substrate 20 as the fixing part, and first damper material 70a as the vibration absorbing member is filled in the first damper space between this damper table 24 and the corner part rear plane 68 of the frame 60 as the blur correction movable part.

Therefore, the first damper member 70a becomes difficult to fall off compared to the case wherein the first damper material 70a is directly filled in the front plane of the circuit substrate 20 as the fixing part. As a result, the damper characteristic is improved, and the resonance can be effectively prevented, and the blur correction ability is improved. That is, the resonance in the perpendicular direction with the optical axis of the frame 60 as the blur correction movable part with respect to the base 10 and the circuit substrate 20 as the fixing part can be suppressed; and particularly the resonance in the optical axis direction can be effectively suppressed.

Also, since the damper table 24 as the pedestal is provided at the front plane of the circuit substrate 20 as the fixing part, by adjusting the area of the front plane of the damper table 24, the coating amount of the gel substance which is the first damper material 70a can be easily controlled; hence the necessary amount of the first damper material 70a can be formed. Further, when the impact force during the falling or so acts thereon, since the first damper space is larger than the driving space, as the driving coils 30a and 30b collides with the driving magnets 80a and 80b, the stopper function comes into effect, thus the damper space will not be lost. Therefore, the first damper material 70a will not completely slip out of the first damper space.

Further, as shown in FIG. 1D as well, the height in Z axis direction of the first driving coil 30a and the second driving coil 30b from the front plane of the circuit substrate 20 as the fixing part are higher than Z axis direction height of the damper table 24. As the damper table 24 is lower than the driving coil 30, the first damper space can be made larger than the driving space.

Also, the frame 60 can be constituted by the plastic or so, hence the contact area with the first damper material 70a can be easily regulated, and the filling amount of the first damper material 70a can be easily regulated as well.

Further, the damper tables 24 are fixed to each four corner positions on the upper plane of the circuit substrate 20 having the square plate shape. Thus, the damper material 70a can be placed by effectively utilizing four vacant spaces of the front plane of the fixed part circuit part 20. Also, since the first damper materials 70a are placed on the diagonal line, the distance between the first damper members 70a can be made furthest against each other. As a result, the frame 60 as the blur correction movable part can be effectively prevented from making the resonance in the direction of the tilt movement with respect to the base 10 and the circuit substrate 20 as the fixing member.

The damper table 24 can be constituted by the chip component such as ceramic electronic components. In case of the chip component, the terminal (external) electrode is formed; hence the connection or the adhesion to the fixing part such as the circuit substrate or so can be done easily. Also, the chip component has a rough surface, thus has excellent bonding with the vibration absorbing member, and the fall of the vibration absorbing member from the pedestal can be effectively suppressed. Note that, the vibration absorption member may adhere not only to the front plane of the pedestal but also to the side plane.

Particularly, in the lens driving device 2 according to the present embodiment, the second damper member 70b is filled in at least one place along the circumference direction at the space between the outer circumference plane of the lens holder 40 and the inner circumference plane of the frame 60. Therefore, the resonance of the lens holder 40 against the frame 60 can be effectively suppressed. As a result, there is no risk of resonance of the lens holder 40 against the frame 60 during the blur correction or the auto focus operation, and particularly during the auto focus operation; thus such operation can be carried out in good condition.

Further, in the lens driving device 2 according to the present embodiment, the second damper material 70b is filled in the space between the outer circumference plane of the lens holder 40 and the inner circumference plane of the frame 60, near the four corner parts of the frame 60, and the depression parts 74 are respectively formed near each corner parts. By constituting as such, by effectively utilizing the vacant space at the inner circumference plane of the frame 60, the second damper material 70b can be placed, and also the second damper material 70b can be placed on the diagonal line; thus the resonance of the lens holder 40 in the direction of the tilt movement with respect to the frame 60 can be prevented further effectively.

At the position where the second damper material 70b is filled of the inner circumference plane of the frame 60, the depression parts 74 are formed which are opened towards the space. Thus, the depression parts 74 functions as the reservoir for the second damper material 70b, thus even if the lens holder 40 moves largely to the optical axis direction or the perpendicular direction with the optical axis with respect to the frame 60, the second damper material 70b barely falls off from the space. Particularly, even if the lens holder 40 moves largely to the optical axis direction or the perpendicular direction with the optical axis with respect to the frame 60 due to the impact of the falling or so, the second damper material 70b barely falls off from the space.

As shown in FIG. 4D, there is an extra space left at the inner circumference plane of the corner parts of the frame 60, by providing the inner side projection parts 72, the depression parts 74 can be easily formed at the front plane 73 of the inner side projection parts 72. At these depression parts 74, the gel form substance which becomes the second damper material 70b can be easily introduced; thus the work efficiency can be improved. Note that, the depression parts 74 may be formed at the outer circumference plane of the lens holder 40, or the depression parts 74 may be formed at both of the inner circumference plane of the frame 60 and the outer circumference plane of the lens holder 40.

Figure 1F:
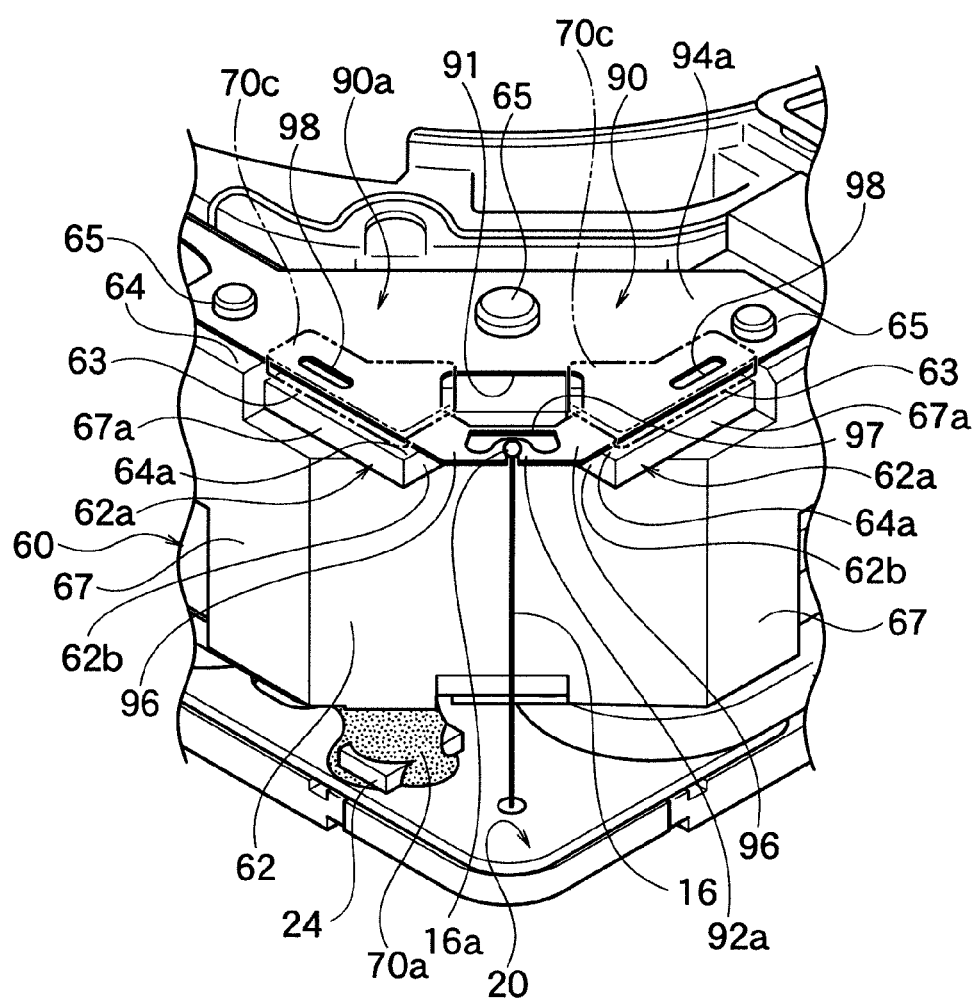
FIG. 1F is the partial perspective view showing the detail of the connection part between the front side spring and the suspension wire shown in FIG. 1B.

Also, in the present embodiment, as shown in FIG. 1F to FIG. H, the first step plane 64a which is depressed in the optical axis (Z axis) direction is formed at the front plane 64 of the frame 60, so that the space 63 is formed between the frame 60 and a part of the divisional plate spring 90a positioned between the frame installation part 94a and the wire installation part 92a. The first step planes 64a are formed at the front plane of the step form projection parts 62a formed in a pair at each corner part of the frame 60; and the first step planes 64a are positioned at both sides of the wire installation part 92a. The step form projection parts 62a are formed by projecting out towards X-Y direction at the front side of Z axis direction of the notch part 62, and at each step form projection part 62a, a notch part 62b is formed which is smaller than the notch part 62. The wire installation part 94a is positioned at the notch part 62b.

Figure 1G:
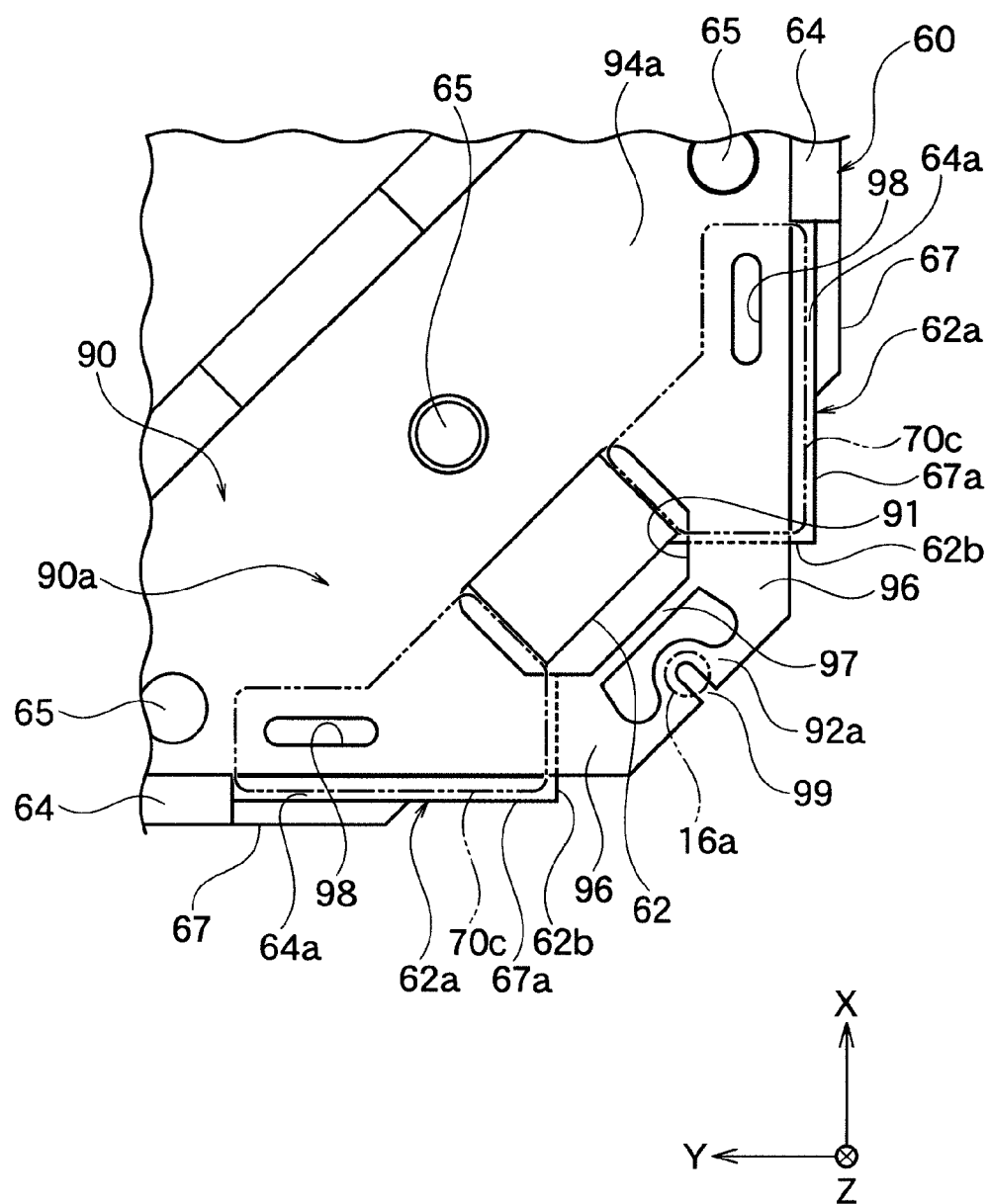
FIG. 1G is the partial planar view showing the detail of the connection part between the front side spring and the suspension wire shown in FIG. 1F.
Figure 1H:
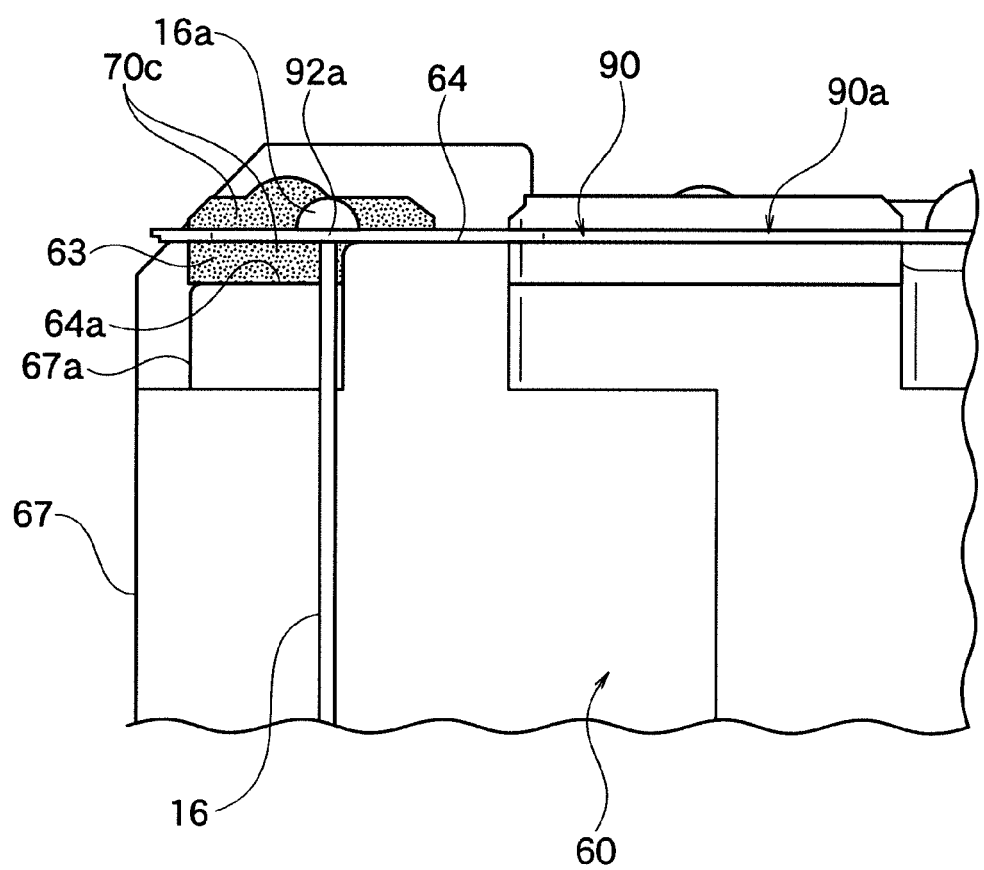
FIG. 1H is the partial side view showing the detail of the connection part between the front side spring and the suspension wire shown in FIG. 1F.

Note that, one divisional plate spring 90a is shown as one example in FIG. 1F to FIG. 1H, but other divisional plate springs 90b to 90d shown in FIG. 2 also have same constitution, thus these will not be shown in the figures and will be omitted from detailed description. Also, the first step plane 64a is shown in FIG. 4A.

As shown in FIG. 1A, the case 11 is placed at the outer side of the frame 60. The outer circumference plane 67 of the frame 60 shown in FIG. 1F to FIG. 1H may contact with the inner plane of the case 11 shown in FIG. 1A due to the relative movement in X-Y direction of the frame 60. In the present embodiment, at each corner part of the frame 60, the second step planes 67*a* depressed in X axis and Y axis direction are formed in a pair at each corner part of the frame 60 from the outer circumference plane 67 of the frame 60 by being adjacent at each first step plane 64*a*. The first step plane 64*a* is placed further inner side than the second step plane 67*a*. The first step plane 64*a* is formed at the front plane of Z axis direction of the step form projection part 62*a*, and the second step plane 67*a* is formed at the side plane of Y axis direction or X axis direction of step form projection part 62*a*.

In the present embodiment, the third damper material 70*c* is filled in the space 63 between the first step plane 64*a* and the rear plane of the divisional plate spring 90*a*. The width of this space 63 is preferably about the same as the width W1 shown in FIG. 1D or the width W2 shown in FIG. 4C. In the present embodiment, each first step plane 64*a* becomes the contact plane between the third damper material 70*c*. The third damper material 70*c* is preferably constituted by the same material of the first damper material 70*a* or the second damper material 70*b*; however it does not necessarily have to be the same material.

At the position where the third damper material 70*c* is placed on the upper plane of the first step plane 64*a*, one or more the through holes 98 having smaller size than the first step plane 64*a* are formed at the divisional plate spring 90*a*. By forming the through holes 98, the third damper material 70*c* can be easily filled in the space 63, and also the continuity of the third damper material 70*c* placed on the upper plane (Z axis direction front plane) of the divisional plate springs 90 will be maintained, hence the vibration absorbing characteristic will be improved.

The pattern of forming of the third damper material 70*c* placed on the upper plane (Z axis direction front plane) of the divisional plate springs 90 is preferably the same pattern as the pattern of forming of the third damper material 70*c* filled in the space 63; however it does not necessarily have to be the same pattern. The thickness in Z axis direction of the third damper material 70*c* placed on the upper plane (Z axis direction front plane) of the divisional plate springs 90 is preferably the same thickness of the third damper material 70*c* filled in the space 63; however it does not necessarily have to be the same thickness.

The area of each of the first step plane 64*a* is not particularly limited; however it is preferably about the same as the area of the damper table 24 where the first damper material 70*a* is provided. In the present embodiment, the third damper material 70*c* will sandwich a part of the divisional plate springs 90 from bottom and top of Z axis direction at the position between the wire installation part 92*a* and the frame installation part 94*a*.

The first step planes 64*a* are placed along the outer shape of the frame 60 while being apart from the wire installation part 92*a* near four corner parts of the frame 60. In accordance with the shape of the first step plane 64*a*, the third damper material 70*c* does not contact with the wire installation part 92*a* and the suspension wire 16, and respectively placed at two places along the outer shape of the frame 60.

In the present embodiment, the space 63 are formed between the frame 60 and a part of the divisional plate springs 90*a* to 90*d* positioned between the installation parts 94*a* to 94*d* and the wire installation parts 92 *a* to 92*d*; and the third damper member 70*c* as the vibration absorbing member is placed in this space 63. Therefore, the frame 60 as the movable part can effectively prevent the vibration in the optical axis direction at the frequency band range connected with AF operation. As the embodiment wherein the frame 60 vibrates in the optical axis direction, the embodiment wherein the four corners of the frame 60 vibrates equally in Z axis direction, and the embodiment vibrating unequally in Z axis direction may be mentioned. In the present embodiment, since the third damper material 70*c* is placed at four corner parts respectively, thus the vibration of the both embodiments can be effectively prevented.

Also, in the present embodiment, since the third damper material 70*c* is placed, the filling amount of the first damper material 70*a* can be made less, and also it won't be necessary to accurately control the filling amount of the first damper material 70*a*. Further, in case of carrying out the vibration suppression in X-Y direction by other means than first damper material 70*a*, or in case there is no need of such vibration suppression, the first damper material 70*a* may not be used. Also, in regards with the second damper material 70*b*, in case of carrying out the vibration suppression in Z axis direction of the lens holder 40 and the frame 60 by other means, or in case such vibration suppression is not necessary, then the second damper material 70*b* may not be used.

Figure 8:
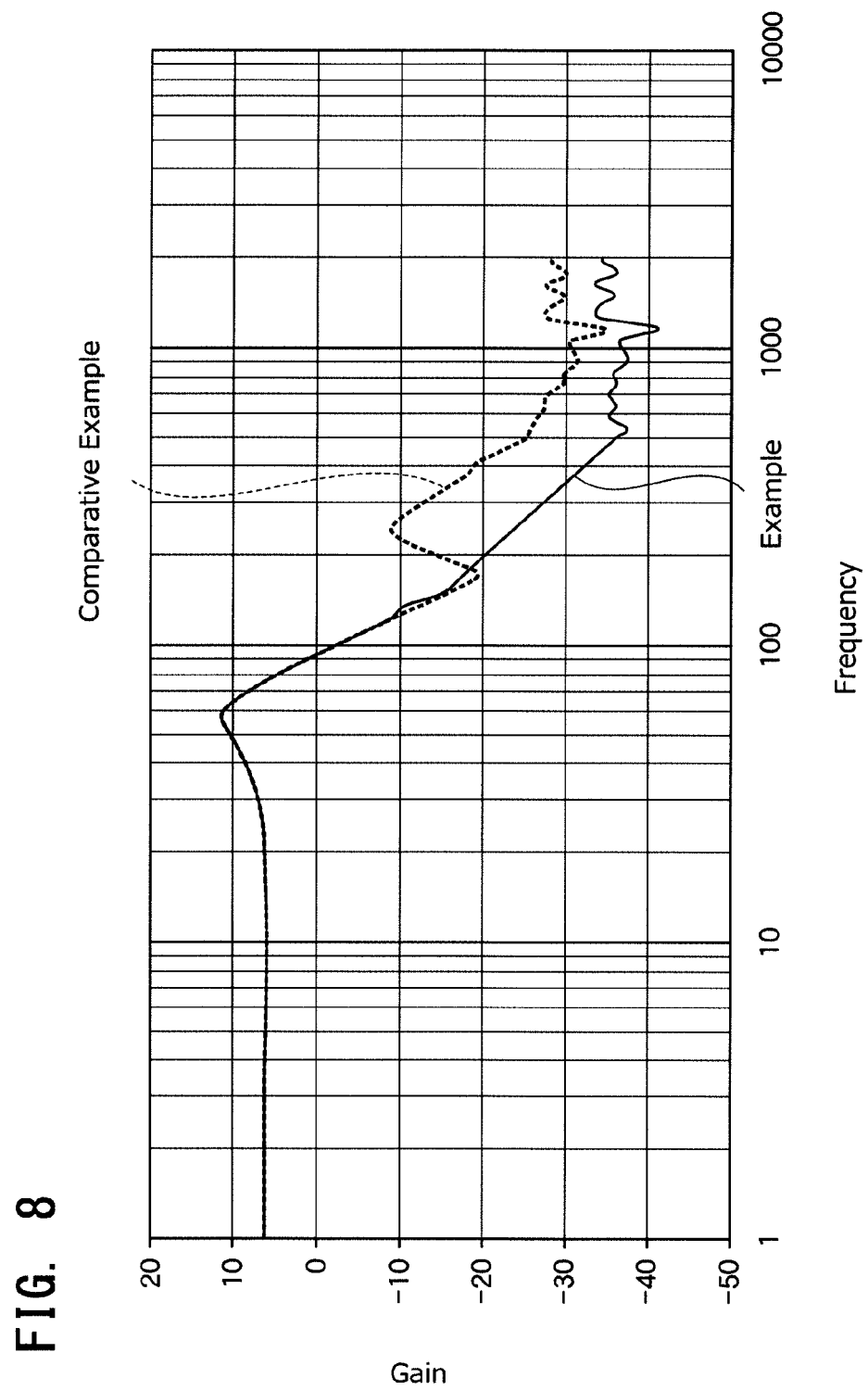
FIG. 8 is the graph showing the presence of the resonance with respect to the frequency of the examples and the comparative examples of the present invention.

As a result, as shown in the examples indicated by a bold line in FIG. 8, this allows to prevent in advance the risk of generating the resonance point (particularly near 300 Hz which is related to AF operation) such as in the comparative example indicated by the broken line of FIG. 8 which does not comprise the third damper material 70*c*. Therefore, even if the person recording the video moves, the focus point shifting can be effectively prevented. Further, the space 63 between the first step plane 64*a* of the frame 60 and a part of the divisional plate springs 90*a* to 90*d* functions as the reservoir for the third damper material 70*c* at the position where the third damper material 70*c* is placed, hence the third damper material 70*c* does not fall off from the space 63.

Furthermore, the third damper material 70*c* is placed along the shape of the outer circumference plane 67 of the frame 60 while being apart from the suspension wire 16 and the wire installation parts 92*a* to 92*d*. By taking such constitution, the frame 60 as the movable part can be effectively prevented from vibrating to Z axis direction.

Also, the wire installation parts 92*a* to 92*d* are placed at the outer side of the notch parts 62 at the corner parts of the frame 60, thus for instance the connection between the tip of the suspension wire 16 and the wire installation parts 92*a* to 92*d* of the divisional plate springs 90*a* to 90*d* can be done easily while maintain the size of the frame 60 compact. Also, the movement in X-Y axis direction crossing with Z axis of the frame 60 can be made smoother. Note that, the connection between the tip of the suspension wire 16 and the wire installation parts 92*a* to 92*d* of the divisional plate springs 90*a* to 90*d* is done for example by the solder or laser welding or so to form the connection part 16*a* (see FIG. 1F to FIG. 1H).

Further, the first step plane 64*a* which is the contact surface of the frame 60 where the third damper material 70*c* contacts is placed at the inner side than the second step plane 67*a*, hence even if the outer circumference plane 67 of the frame 60 contacts with the inner circumference plane of the case 11 by moving inside the case 11 shown in FIG. 1A, the third damper material 70*c* does not contacts with the inner circumference plane of the case 11. Therefore, the third damper material 70*c* has only little possibility to drip or fall off to the inner circumference plane of the caser 11 from the predetermined position.

Further, in the present embodiment, the third damper material 70*c* contacts with both sides of the divisional plate springs 90*a* to 90*d* in Z axis direction, thus the vibration suppression effect can be enhanced. Further, at the position where the third damper material 70c is placed, the through hole 98 is formed in the divisional plate springs 90a to 90d, thus the third damper material 70c can be easily filled via the through hole 98, and also the third damper material 70c can be easily placed at both sides of the divisional plate springs 90a to 90d.

Further, as shown in FIG. 1G, the wire installation parts 92a to 92d comprises the depression part 99 which is depressed to the inside as in the shape of letter U, hence the tip of the suspension wire 16 can be laser welded or soldered by installing to the wire installation part 92a via the depression part 99 having the shape of letter U.

Also, as shown in FIG. 1F and FIG. 1G, the opening part 91 is formed at the divisional plate springs 90a to 90d positioned between a pair of the first step part 64a positioned near the corner part of the frame 60; and the wire installation part 92a is formed at the crossing part of a pair of the arm parts 96 which are continuous from the frame installation parts 94a to 94d. Also, the arm parts 96 respectively comprise a part which does not contact with the third damper material 70c. Further, separate from the crossing part of these arm parts 96, the bridge part 97 which bridges these arm parts 96 is formed.

By taking such constitution, the stress trying to focusing on the arm parts 96 can be dispersed to the bridge part 97, and the strength of the wire installation parts 92a to 92d can be enhanced, thus the tip of the suspension wire 16 can be effectively prevented from coming off of the wire installation parts 92a to 92d.

Also, at some point of the arm parts 96 towards the wire installation parts 92a to 92d from the frame installation part 94a, there is a part where the width of the divisional plate springs 90a to 90d becomes narrower, hence the resilience of the wire installation parts 92a to 92d improves, and the buckling of the suspension wire 16 can be effectively prevented.

Second Embodiment

Figure 1I:
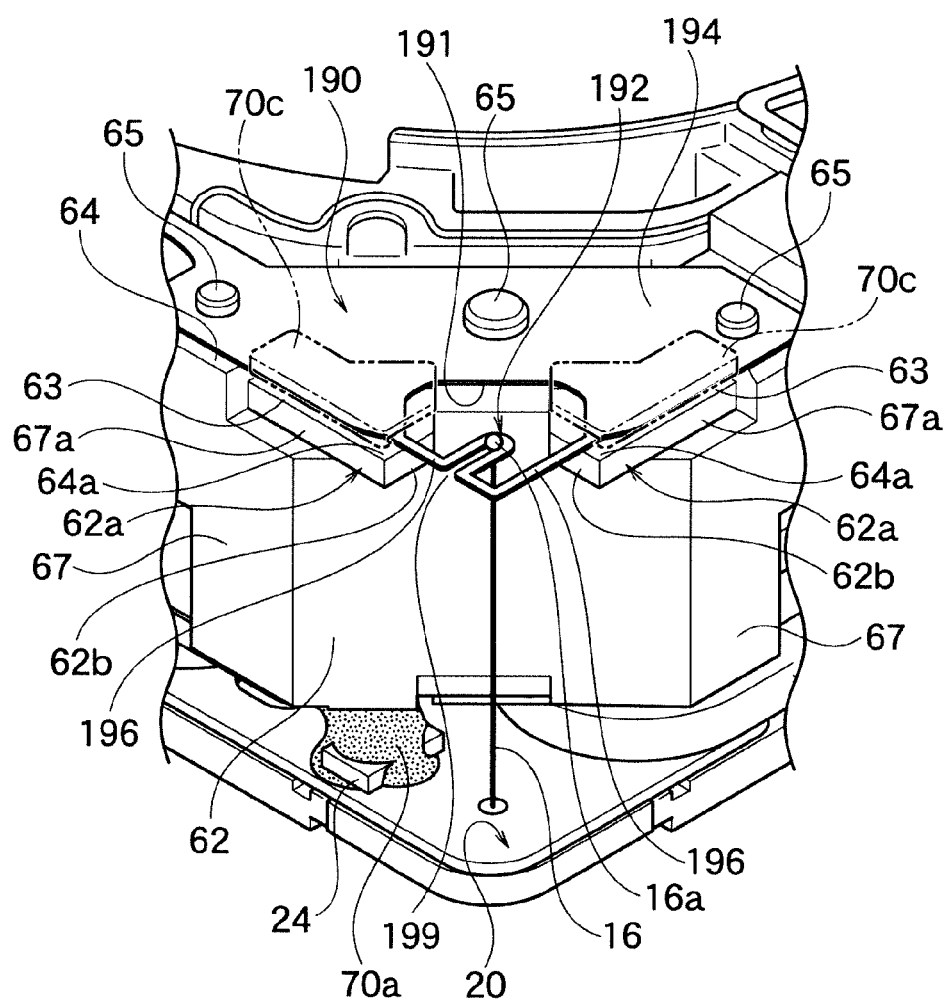
FIG. 1I is the partial perspective view showing the detail of the connection part between the front side spring and the suspension wire used in the lens driving device according to other embodiment of the present invention.
Figure 1J:
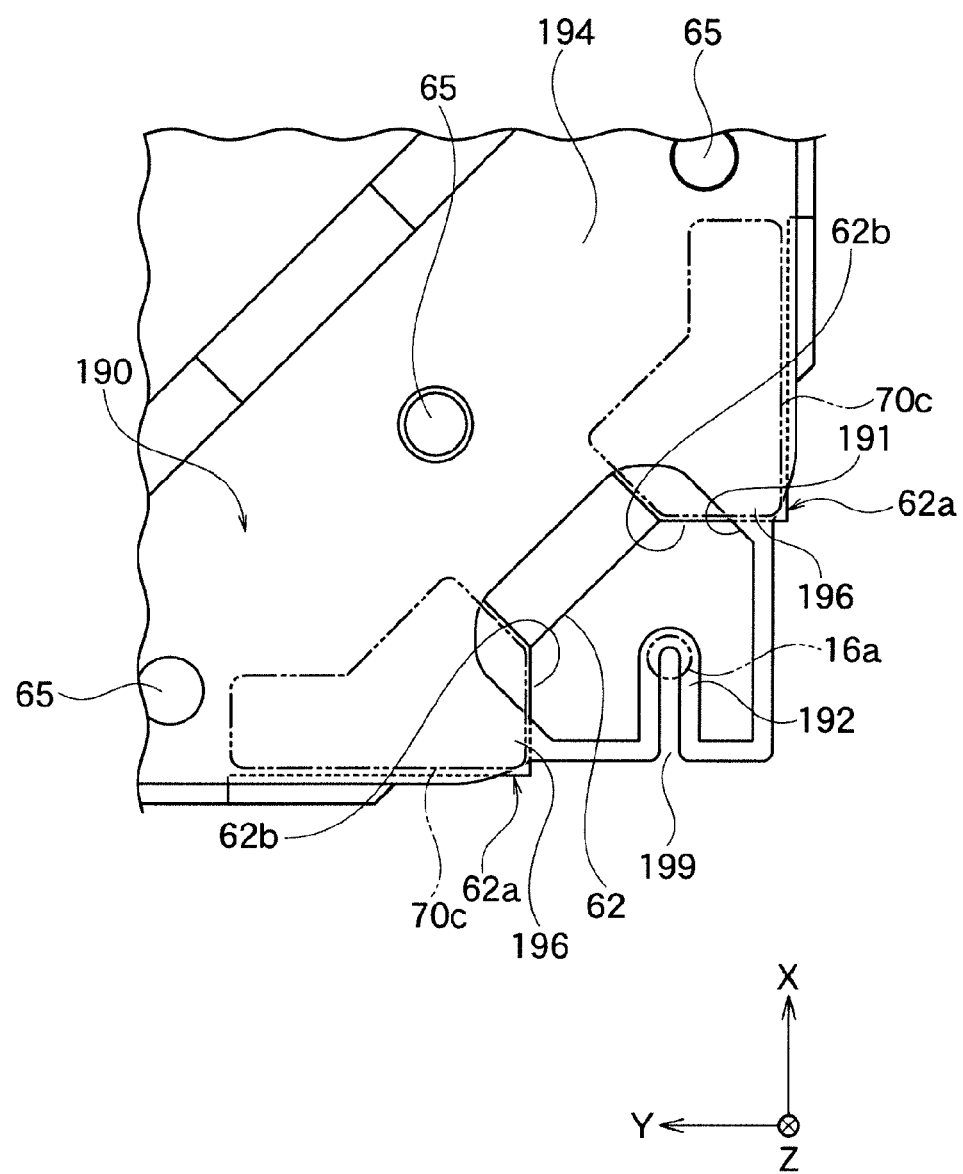
FIG. 1J is the partial planar view showing the detail of the connection part between the front side spring and the suspension wire shown in FIG. 1.

As shown in FIG. 1I and FIG. 1J, the lens driving device according to the second embodiment of the present invention only differs in the constitution of the four divisional plate springs 190 which constitutes the front side spring as the resilient member; and other constitutions and the effects are the same as the first embodiment, thus for the common parts, the description will be omitted. Hereinafter, the parts which differ from the first embodiment will be mainly discussed.

The divisional plate springs 190 of the present embodiment does not have the through hole 98 shown in FIG. 1F and FIG. 1G, and also the bridge part 97 is also not formed. Also, the shape of the opening part 191 differs from the shape of the opening part 91. Also, the shape of the arm part 196 differs from the shape of the arm part 96. In the wire installation part 192, it is the same as the depression part 99 of the first embodiment as the depression part 199 having the shape of letter U is formed. The shape of the frame installation part 194 is about the same as the frame installation parts 94a to 94d of the first embodiment except that the through hole 98 is not formed. The other constitutions and the effects of the present embodiment are the same as the first embodiment.

Third Embodiment

Figure 1K:
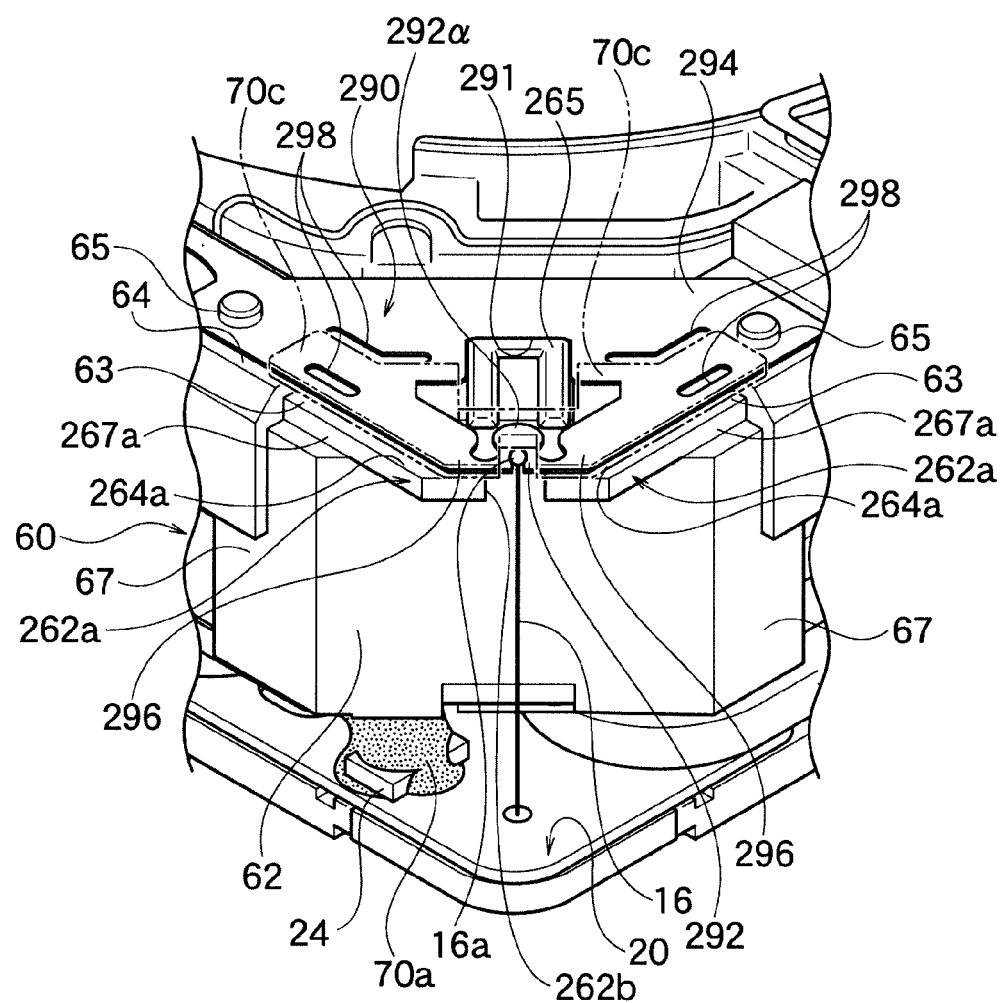
FIG. 1K is the partial perspective view showing the detail of the connection part between the front side spring and the suspension wire used in the lens driving device according to further other embodiment of the present invention.
Figure 1L:
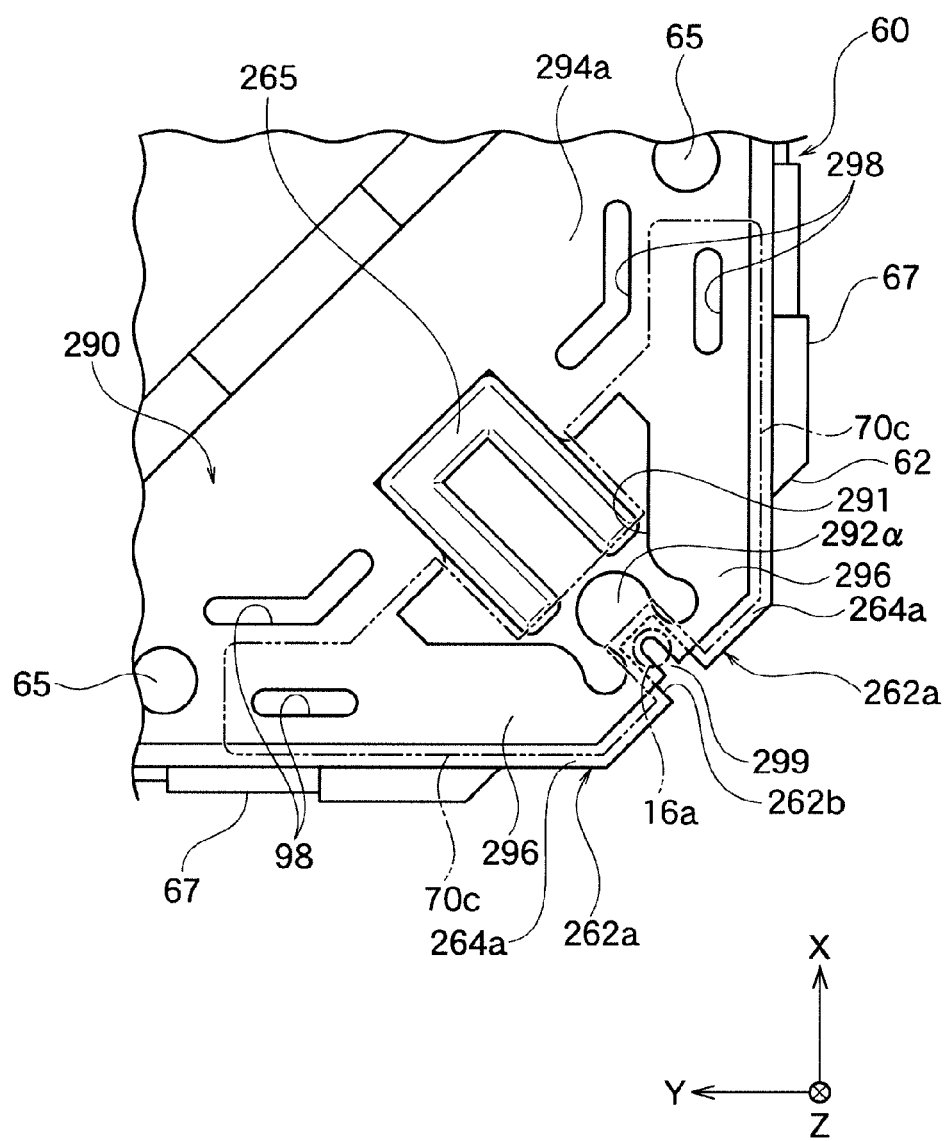
FIG. 1L is the partial planar view showing the detail of the connection part between the front side spring and the suspension wire shown in FIG. 1K.

As shown in FIG. 1K and FIG. 1L, the lens driving device according to the third embodiment of the present invention only differs in the constitution of the four divisional plate springs 290 which constitutes the front side spring as the resilient member, and the constitution of the step form projection part 262a (corresponding to the step form projection part 62a) of the frame 60 differs; and other constitutions and the effects are the same as the first and second embodiment, thus for the common parts, the description will be omitted. Hereinafter, the parts which differ from the first embodiment will be mainly discussed.

In the divisional plate spring 290 of the present embodiment, the number and the arrangement of the through hole 298 which corresponds to the through hole 98 shown in FIG. 1F to FIG. 1H are different, and also the shape of the wire installation part 292 is different. Regarding the wire installation part 292, it is the same as the depression part 99 of the first embodiment from the point that the depression part 299 having the shape of letter U is formed, however the tongue part 292α of circular shape is formed as one body with the plate spring 290 at the inside (the optical axis side) of the depression part 299. At least part of the tongue part 292α (most part in the figure) contact with the first step plane 264a of the step form projection part 262a via the third damper material 70c.

The second step plane 267a of the step form projection part 262a is the same as the second step plane 67a of the above mentioned embodiment; however the notch part 262b of the step form projection part 262a is narrower than notch part 62b of the above mentioned embodiment. On the notch part 262b, the wire installation part 292 excluding the tongue part 292α is positioned. The notch part 262b is about the size of passing the suspension wire 16, and allowing the tongue part 292α to contact with the first step plane 264a of the step form projection part 262a via the third damper material 70c. The third damper material 70c does not contact with the connection part 16a of the wire 16.

In the present embodiment, the shape of the opening part 291 is different from the shape of the opening part 91 of the above mentioned embodiment, and the bridge part 97 is also not formed. At the opening part 291, the installation projection part 265 formed at the front plane 64 of the frame 60 is inserted, and the divisional plate spring 290 and the frame 60 are to be positioned. Also, the shape of the arm part 296 is also different from the shape of the arm 96 of the above mentioned embodiment. Further, the shape of the frame installation part 294 is about the same as the frame installation part 94a to 94d of the first embodiment except that the shape and the number of the through hole 298 and the shape of the opening part 291 are different.

In the present embodiment, to the inner side (the optical axis side of the lens) of the depression part 299 of the wire installation part 292, the tongue part 292α of circular shape is formed as one body with the plate spring 290. At least part of the tongue part 292α (most part in the figure) contact with the first step plane 264a of the step form projection part 262a via the third damper material 70c. That is, in the present embodiment, near the connection part 16a which is not in contact with the third damper material 70c, a part of the wire installation part 292 is in contact with the first step plane 264a of the step form projection part 262a via the third damper material 70c. Therefore, the resonance suppression effect improves, and particularly the resonance suppression effect in the blur correction direction (X axis direction and Y axis direction) improves. The other constitutions and the effects of the present embodiment are the same as the first and second embodiments.

Fourth Embodiment

Figure 1M:
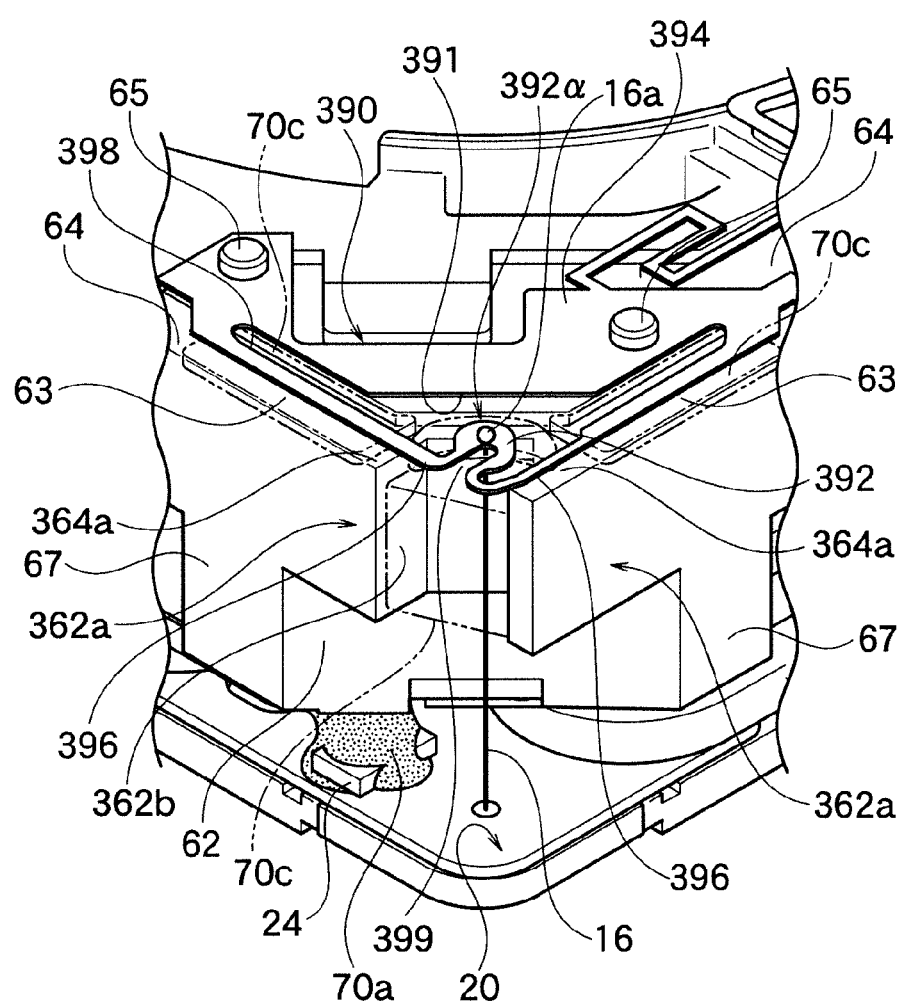
FIG. 1M is the partial perspective view showing the detail of the connection part between the front side spring and the suspension wire used in the lens driving device according to further other embodiment of the present invention.
Figure 1N:
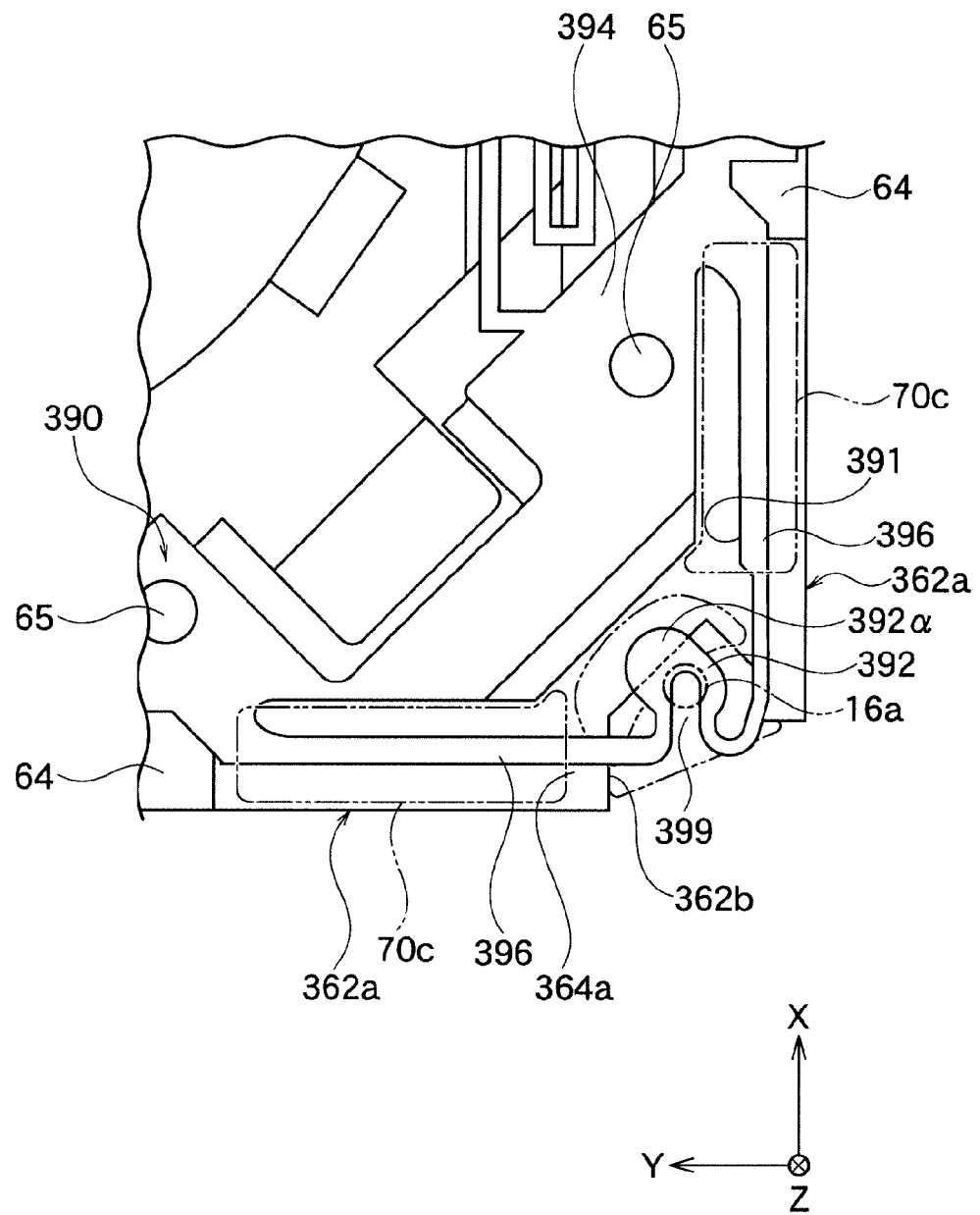
FIG. 1N is the partial planar view showing the detail of the connection part between the front side spring and the suspension wire shown in FIG. 1M.

As shown in FIG. 1M and FIG. 1N, the lens driving device according to the fourth embodiment of the present invention only differs in the constitution of the four divisional plate springs 390 which constitutes the front side spring as the resilient member, and the constitution of the step form projection part 362a (corresponding to the step form projection part 62a) of the frame 60 differs; and other constitutions and the effects are the same as the first to third embodiment, thus for the common parts, the description will be omitted. Hereinafter, the parts which differ from the first embodiment will be mainly discussed.

In the divisional plate spring 390 of the present embodiment, the through hole 398 which corresponds to through hole 98 shown in FIG. 1F and FIG. 1G is connected with the opening part 391, and the shape of the frame installation part 394 is different and also the shape of the wire installation part 392 is different as well. As for the wire installation part 392, it is the same as the depression part 199 of the second embodiment from the point that the depression part 399 having the shape of letter U is formed, however at the inside (the optical axis side of the lens) of the depression part 399, the tongue part 392a having a half circle shape is formed as one body with the plate spring 390. At least part of the tongue part 392a (most part in the figure) contact with the first step plane 364a of the step form projection part 362a via the third damper material 70c.

In the present embodiment, the step plane corresponding to the second step plane 67a and 267a mentioned in the above is not formed at the step form projection part 362a. Also, the notch part 362b of the step form projection part 362a is narrower than the notch part 62b of the above embodiment; however it is wider than the notch part 262b. On the notch part 362b, the wire installation part 392 excluding the tongue part 392a is positioned.

The notch part 362b is about the size of passing the suspension wire 16, and allowing the tongue part 392a to contact with the first step plane 364a of the step form projection part 362a via the third damper material 70c. The third damper material 70c does not contact with the connection part 16a of the wire 16. Regarding the notch part 362b, at the lower position in Z axis direction of the wire installation part 392, the third damper material 70c may be embedded so that it does not contacts with the wire installation part 392 and the connection part 16a. The third damper material 70c embedded in the notch part 362b is only in contact with the suspension wire 16 and the inner plane of the notch part 362b.

In the present embodiment, the shape of the opening part 391 is different from the shape of the opening part 91 of the embodiment mentioned in the above, and also the bridge part 97 is not formed. Also, the shape of the arm part 396 is different from the shape of the arm part 96 of the embodiment mentioned in the above. Further, the shape of the frame installation part 394 is basically about the same as the frame installation parts 94a to 94d of the first embodiment, except that the shape and the number of the through hole 398 and the shape of the opening part 391 are different.

In the present embodiment, to the inner side (the optical axis side of the lens) of the depression part 399 of the wire installation part 392, the tongue part 392a of circular shape is formed as one body with the plate spring 390. At least part of the tongue part 392a (most part in the figure) contact with the first step plane 364a of the step form projection part 362a via the third damper material 70c. That is, in the present embodiment, near the connection part 16a which is not in contact with the third damper material 70c, a part of the wire installation part 392 is in contact with the first step plane 364a of the step form projection part 362a via the third damper material 70c. Therefore, the resonance suppression effect improves, and particularly the resonance suppression effect in the blur correction direction (X axis direction and Y axis direction) improves. The other constitutions and the effects of the present embodiment are the same as the first to third embodiments.

Fifth Embodiment

The lens driving device according to the fifth embodiment of the present invention has the same constitutions and the same effects as the first to fourth embodiment, except that the third damper member 70c and the first damper member 70a of the above mentioned first to fourth embodiment are not provided; hence the description of the common parts with the first to fourth embodiment will be omitted. Hereinafter, the parts which differ from the above mentioned embodiment will be mainly discussed.

In above mentioned the first to fourth embodiments, the lens driving device 2 comprise two mechanisms of the autofocus mechanism and the blur correction mechanism; however in the lens driving device of the present embodiment, the autofocus mechanism may at least comprised. That is, the frame 60 may be fixed to the base 10.

In the lens driving device according to the present embodiment, the second damper material 70b is filled in at least one place along the circumference direction at the space between the outer circumference plane of the lens holder 40 and the inner circumference plane of the frame 60. Therefore, the resonance of the lens holder 40 against the frame 60 can be effectively suppressed. As a result, during the blur correction operation or the auto focusing operation, and particularly in case of the auto focusing operation, there is no risk of the resonance of the lens holder 40 against the frame 60, thus these operations can be carried out in good condition.

Furthermore, in the lens driving device 2 according to the present embodiment, the second damper material 70b is filled in the space between the outer circumference plane of the lens holder 40 and the inner circumference plane of the frame 60 near the four corner parts of the frame 60; and the depression parts 74 are respectively formed near each corner parts. By constituting as such, the vacant space at the inner circumference plane of the frame 60 can be utilized effectively, and the second damper material 70b can be placed, and also the second damper material 70b can be placed on the diagonal line, hence the resonance of the lens holder 40 in the direction of the tilt movement against the frame 60 can be further effectively prevented.

The depression part 74 which is opened towards the space is formed at the inner circumference plane of the frame 60 at the position where the second damper material 70b is filled. Thus, the depression part 74 function as the reservoir of the second damper material 70b, therefore even if the lens holder 40 moves to the optical axis direction or to the perpendicular direction with the optical direction with respect to the frame 60, the second damper material 70b does not fall off from the space. Particularly, when the impact acts on due to the falling or so and thus the lens holder 40 moves to the optical axis direction or to the perpendicular direction with the optical direction with respect to the frame 60, the second damper material 70b does not fall off from the space.

As shown in FIG. 4C, there is still room left in the inner circumference plane of the corner part of the frame 60, thus by providing the inner side projection part 72, the depression part 74 can be easily formed to the front plane 73 of the inner side projection part 72. At these depression parts 74, the gel form substance which becomes the second damper material 70b can be easily introduced; thus the work efficiency can be improved. Note that, the depression parts 74 may be formed at the outer circumference plane of the lens holder 40, or the depression parts 74 may be formed at both of the inner circumference plane of the frame 60 and the outer circumference plane of the lens holder 40.

Sixth Embodiment

The lens driving device according to the sixth embodiment of the present invention has the same constitutions and the same effects as the first to fourth embodiment, except that the third damper member 70c and the second damper member 70b of the above mentioned first to fourth embodiment are not provided; hence the description of the common parts with the first to fourth embodiments will be omitted. Hereinafter, the parts which differ from the above mentioned embodiments will be mainly discussed.

In above mentioned first to fourth embodiments, the lens driving device 2 comprise two mechanisms of the autofocus mechanism and the blur correction mechanism; however in the lens driving device of the present embodiment, the blur correction mechanism may at least comprised.

In the lens driving device according to the present embodiment, the coil is not embedded inside the coil substrate, but the first driving coil 30a and the second driving coil 30b are fixed to the front plane of the circuit substrate 20 as the fixing part. Therefore, the number of winding of the driving coils 30a and 30b can be easily increased, and thus the driving force of the driving coils 30a and 30b can be enlarged.

Further in the lens driving device according to the present embodiment, the damper table 24 as the pedestal is provided at the front plane of the circuit substrate 20 as the fixing part, and first damper material 70a as the vibration absorbing member is filled in the damper space between this damper table 24 and the corner part rear plane 68 of the frame 60 as the movable part.

Therefore, the first damper member 70a becomes difficult to fall off compared to the case wherein the first damper material 70a is directly filled in the front plane of the circuit substrate 20 as the fixing part. As a result, the damper characteristic by the vibration absorbing member is improved, and the resonance can be prevented, and the blur correction ability is improved. That is, the resonance in the perpendicular direction with the optical axis of the frame 60 as the movable part with respect to the base 10 and the circuit substrate 20 as the fixing part can be suppressed, and also the resonance in the optical axis direction can be effectively suppressed.

Also, since the damper table 24 as the pedestal is provided at the front plane of the circuit substrate 20 as the fixing part, by adjusting the area of the front of the damper table 24, the coating amount of the gel substance which is the first damper material 70a can be easily controlled; hence the necessary amount of the first damper material 70a can be formed. Further, when the impact force during the falling or so acts thereon, since the first damper space is larger than the driving space, as the driving coils 30a and 30b collides with the driving magnets 80a and 80b, the stopper function comes into effect, thus the damper space will not be lost. Therefore, the first damper material 70a will not completely slip out of the first damper space.

Further, as shown in FIG. 1D as well, the height in Z axis direction of the first driving coil 30a and the second driving coil 30b from the front plane of the circuit substrate 20 as the fixing part are higher than Z axis direction height of the damper table 24. As the damper table 24 is lower than the driving coil 30, the first driving space can be made larger than the driving space.

Also, the frame 60 can be constituted by the plastic or so, hence the contact area with the first damper material 70a can be easily regulated, and the filling amount of the first damper material 70a can be easily regulated as well.

Further, the damper tables 24 are fixed to each four corner positions on the upper plane of the circuit substrate 20 having the square plate shape. Thus, the damper material 70a can be placed by effectively utilizing four vacant spaces of the front plane of the fixed part circuit part 20. Also, since the first damper materials 70a are placed on the diagonal line, the distance between the first damper members 70a can be made furthest against each other. As a result, the frame 60 as the blur correction movable part can be effectively prevented from making the resonance in the direction of the tilt movement with respect to the base 10 and the circuit substrate 20 as the fixing member.

The damper table 24 can be constituted by the chip component such as ceramic electronic components. In case of the chip component, the terminal (external) electrode is formed; hence the connection or the adhesion to the fixing part such as the circuit substrate or so can be done easily. Also, the ceramic electronic component has a rough surface, thus has excellent bonding with the first damper material 70a, and the falling of the first damper material 70a from the damper table 24 can be effectively suppressed. Note that, the first damper material 70a may adhere not only to the front plane of the damper table 24 but also to the side plane.

Note that, the present invention is not limited to the aforementioned embodiments, and it can be variously modified. For example, the damper table 24 as the pedestal is fixed to the surface of the circuit substrate by reflow or so, but it may be formed as one body with the circuit substrate.

Also, in the present embodiment, the rear plane projection part 69 projecting out towards the damper table 24 is formed at the corner part rear plane 68 of the frame 60 which is the blur correction movable part; however the rear plane projection part 69 is not necessarily needed. By providing the rear plane projection part 69, the space width of the first damper space along Z axis direction can be easily regulated, however depending on the height of the damper table 24 in Z axis direction, it may be better not to have the rear plane projection part 69.

Also, in the above mentioned embodiment, the first driving axis and the second driving axis are placed in parallel to each sides of the base part 10 of the square board shape and the circuit substrate 20; however it is not limited thereto. For example, the first driving coil 30a and the second riving coil 30b may be placed so that the first driving axis and the second driving axis are positioned on the diagonal line of the base part 10 of the square board shape and the circuit substrate 20.

Further, in the above mentioned embodiments, single magnet 80 functions as both the blur correction magnet and the autofocus magnet; however separate magnets may be prepared and installed.

Also, in the above mentioned embodiment, the crossing angle between the first driving axis and the second driving axis was 90 degrees; however, for the present invention, these crossing angles may be other than 90 degrees.

In the above mentioned embodiments, four suspension wires 16 are used as the means to hold the frame 60 as the blur correction movable part moving freely along the driving plane (including X axis and Y axis) with respect to the base part 10 as the fixing part; however the number of the suspension wires is not limited to four, and plural numbers may be used.

Also, the front side springs 90 and 190 as the resilient member is not limited to those diving the plate spring into four parts, and it may be two divisional type or may be divided into four or more, or it may be single spring.

Further, the supporting part is not limited to the suspension wire 16, and it may be other supporting parts for example a plate spring, ball bearing or so. Also, the specific shape of the tongue parts 292α and 392α in the above mentioned third and fourth embodiments are not limited to circular shape or half circular shape, and it may be oval shape, half oval shape, trapezoid and other polygonal shape. Also, the specific shape of the tongue parts 292α and 392α is preferably a shape wherein the width becomes wider towards the projection direction from the wire installation parts 292 and 392. By having such shape, the contact area between the third damper material 70c can enlarged without interfering the arm parts 296 and 396, thus the resonance suppression effect can be improved.

NUMERICAL REFERENCES

2 . . . Lens driving device
10 . . . Base part
11 . . . Case
12 . . . Base opening part
14 . . . Cylinder shape projection part
16 . . . Suspension wire
16a . . . Connection part
18a, 18b . . . Position sensor
20 . . . Circuit substrate
22 . . . Substrate opening part
23 . . . Connector part
24 . . . Damper table
30 . . . Blur correction coil
30a . . . First driving coil
30b . . . Second driving coil
40 . . . Lens holder
41 . . . Sensor component
42 . . . Front plane
43a to 43d . . . Installation projection parts
44a to 44d . . . Plate spring installation parts
45 . . . Rear plane
46 . . . Focusing coil
47 . . . Outer circumference plane
48 . . . Inner circumference plane
49 . . . Step part
50 . . . Rear side spring
50a, 50b . . . Divisional plate springs
52a, 52b . . . Frame installation parts
54a, 54b . . . Holder installation parts
55a to 55d . . . Meandering parts
60 . . . Frame
61 . . . Magnetic board
62 . . . Notch part
62a, 262a, 362a . . . Step form projection part
62b, 262b, 362b . . . Notch part
63 . . . Space
64 . . . Front plane
64a, 264a, 364a . . . First step plane
65, 265 . . . Installation projection part
66 . . . Magnet installation depression part
67 . . . Outer circumference plane
67a, 267a . . . Second step plane
68 . . . Corner part rear plane
69 . . . Rear plane projection part
70a . . . First damper member
70b . . . Second damper member
70c . . . Third damper member
72 . . . Inner side projection part
73 . . . Front plane
74 . . . Damper depression part
80 . . . Magnet
80a . . . First driving magnet
80b . . . Second driving magnet
90 . . . Front side spring
90a to 90d, 190, 290, 390 . . . Divisional plate spring
91, 191, 291, 391 . . . Opening part
92a to 92d, 192, 292, 392 . . . Wire installation part (Support installation part)
292α, 392α . . . Tongue part
93a to 93d . . . Holder installation part
94a to 94d, 194, 294, 394 . . . Frame installation part
95a to 95d . . . Meandering part
96, 196, 296, 396 . . . Arm part
97 . . . Bridge part
98, 298, 398 . . . Through hole
99, 199 . . . Depression part
100 . . . Lens

The invention claimed is:

1. A lens driving device comprising
a lens holder capable of holding at least one lens,
a resilient member holding said lens so to allow a relative movement against a frame along an optical axis of said lens,
an optical axis direction driving part allowing a relative movement of said lens holder against said frame along said optical axis,
a supporting part connecting said resilient member and a fixing part so that said frame is supported in a movable manner against said fixing part along a direction crossing with said optical axis, and
a crossing direction driving part moving said frame against said fixing part along the direction crossing with said optical axis; wherein
said resilient member comprises
a holder installation part installed to said lens holder,
a frame installation part installed to said frame, the frame installation part being connected with the holder installation part,
a support installation part installed to said supporting part, the support installation part being continuous with the frame installation part,
a space is formed between said frame and a part of said resilient member which is positioned between said frame installation part and said support installation part, and
a vibration absorbing member is placed in said space.

2. The lens driving device as set forth in claim 1, wherein a notch part is formed at said frame so that the support installation part of said resilient member is placed at outer side of said frame.

3. The lens driving device as set forth in claim 1, wherein a first step plane which is depressed in said optical axis direction to form said space is formed at said frame, and said vibration absorbing member is placed in the space between said first step plane and said resilient member.

4. The lens driving device as set forth in claim 1, wherein a case fixed to said fixing part is arranged at the outer side of said frame,
a second step plane depressed in substantially perpendicular direction with said optical axis is formed from the outer plane of said frame which has possibility to contact with an inner plane of said case due to the relative movement of said frame, and a contact surface of said frame where said vibration absorbing member contacts is arranged further inner side than said second step plane.

5. The lens driving device as set forth in claim 1, wherein said support installation part formed at said resilient member has a depressed shape towards the inside as in a shape of letter U.

6. The lens driving device as set forth in claim 1, wherein
said support installation part is formed at a crossing part of a pair of arm parts continuous with said frame installation part,
said arm part has a part which does not contact with said vibration absorbing member, and
other than the crossing part of these arm parts, a bridge part to bridge these arm parts are formed at said resilient member.

7. The lens driving device as set forth in claim 1, wherein said resilient member has a part where width of said resilient member becomes narrower at some points of said resilient member towards said support installation part from said frame installation part.

8. The lens driving device as set forth in claim 1, wherein a tongue part is formed at said support installation part, and said vibration absorbing member is placed between said frame and at least a part of said tongue part.

9. The lens driving device as set forth in claim 1, wherein said vibration absorbing member is also in contact with a second plane of the resilient member which is positioned at the opposite of the first plane of said resilient member contacting with said vibration absorbing member placed in said space.

10. The lens driving device as set forth in claim 9, wherein at a part of said resilient member to which said vibration absorbing member contacts at both of the first plane and the second plane, a through hole penetrating through said first plane and said second plane is formed.

11. The lens driving device as set forth in claim 1, wherein said vibration absorbing member is placed along an outer shape of said frame while being apart from said support installation part.

12. The lens driving device as set forth in claim 11, wherein said frame has roughly a square ring shape, and
said vibration absorbing members are placed respectively at two or more positions near four corners of said frame along the outer shape of said frame while being apart from said support installation part.

13. The lens driving device as set forth in claim 12, wherein said resilient members are placed at four corner parts of said frame by being separated and insulated respectively.

14. A lens driving device comprising
a lens holder capable of holding at least one lens,
a frame for holding the lens holder in a movable manner along an optical axis of the lens,
a driving part moving said lens holder relative to a frame along an optical axis of said lens, wherein
in a space between outer circumference plane of said lens holder and inner circumference plane of said frame, a vibration absorbing member is filled in at least one point along the circumference direction,
at either one of the outer circumference plane of said lens holder and inner circumference plane of said frame, a depression part is formed which is opened towards said space at a position where said vibration absorbing member is filled in, and
said vibration absorbing member filled in said space is also continuously filled in said depression part.

15. The lens driving device as set forth in claim 14, wherein said vibration absorbing member is filled in three or more places at between the outer circumference plane of said lens holder and the inner circumference plane of said frame along the circumference direction.

16. The lens driving device as set forth in claim 14, wherein said frame is roughly a square ring shape,
said vibration absorbing member is filled in the space between the outer circumference plane of said lens holder and the inner circumference plane of said frame near the four corners of said frame respectively, and
said depression parts are respectively formed near each four corner parts.

17. The lens driving device as set forth in claim 14, wherein said depression parts is formed at the Inner circumference plane of said frame.

18. The lens driving device as set forth in claim 14, wherein said depression parts is formed at both of the inner circumference plane of said frame and the outer circumference plane of said lens holder.

19. A lens driving device comprising
a movable part capable of holding at least one lens,
a first driving part allowing said movable part to move relative to a fixing part along a first driving axis crossing with an optical axis of said lens, and
a second driving part allowing said movable part to move relative to said fixing part along a second driving axis crossing with the optical axis of said lens and with said first driving axis; wherein
the first driving part comprises a first driving coil and a first driving magnet, the first driving coil and the first driving magnet being placed along the optical axis direction while taking a predetermined driving space and facing against each other,
the second driving part comprises a second driving coil and a second driving magnet, the second driving coil and the second driving magnet being placed along the optical axis direction while taking the driving space and facing against each other,
at a front plane of said fixing part, the first driving coil and the second driving coil are fixed,
at a rear plane of said movable part, the first driving magnet and the second driving magnet are fixed so as to face with said first driving coil and second driving coil across the driving space,
a pedestal is provided at the front plane of said fixing part,
a vibration absorbing member is filled in a damper space between the front plane of said pedestal and the rear plane of said movable part, and
said damper space is larger than said driving space.

20. The lens driving device as set forth in claim 19, wherein a height of said first driving coil and said second driving coil from the front plane of said fixing part are higher than a height of said pedestal.

21. The lens driving device as set forth in claim 19, wherein said movable part comprises a frame holding said first driving magnet and the second driving magnet, and
said vibration absorbing member is filled in said damper space formed between the rear plane of said frame and front plane of said pedestal.

22. The lens driving device as set forth in claim 19, wherein said fixing part is roughly a square board shape, said first driving coil and the second driving coil are respectively fixed at four sides positions of said fixing part having square board shape, and said pedestal is fixed to each four corner positions of said fixing part having square board shape.

23. The lens driving device as set forth in claim 19, wherein said fixing part comprises a circuit substrate, and said first driving coil and said second driving coil are fixed at the front plane of said circuit substrate, and said pedestal is a chip component fixed to the front plane of said circuit substrate.

24. The lens driving device as set forth in claim 19, wherein at the rear plane of said movable part, the rear plane projection part is formed which projects out towards said pedestal, and said damper space is formed between said rear plane projection part and said pedestal.

* * * * *